United States Patent [19]
Hirashima

[11] Patent Number: 5,119,192
[45] Date of Patent: Jun. 2, 1992

[54] TELEVISION SIGNAL PROCESSOR HAVING MEANS FOR COMPARING AND DELETING COINCIDENT VIDEO SIGNAL COMPONENTS FOR TRANSMISSION

[75] Inventor: Masayoshi Hirashima, Ibaraki, Japan

[73] Assignee: Matsushita Electric Industrial Co., Ltd., Osaka, Japan

[21] Appl. No.: 476,495

[22] PCT Filed: Oct. 13, 1989

[86] PCT No.: PCT/JP89/01057

§ 371 Date: Jun. 11, 1990

§ 102(e) Date: Jun. 11, 1990

[87] PCT Pub. No.: WO90/04307

PCT Pub. Date: Apr. 19, 1990

[30] Foreign Application Priority Data

Oct. 13, 1988 [JP] Japan ............... 63-257560
Dec. 28, 1988 [JP] Japan ............... 63-334488
Feb. 9, 1989 [JP] Japan ............... 1-30532
Mar. 3, 1989 [JP] Japan ............... 1-52271

[51] Int. Cl.⁵ .............................................. H04N 7/13
[52] U.S. Cl. .................................... 358/135; 358/136
[58] Field of Search ............. 358/135, 136, 133, 426

[56] References Cited
U.S. PATENT DOCUMENTS

| | | | |
|---|---|---|---|
| 3,752,913 | 8/1973 | Connor et al. | 358/136 |
| 3,767,847 | 10/1973 | Haskell et al. | 358/135 X |
| 3,940,555 | 2/1976 | Amano et al. | 358/135 X |
| 4,402,010 | 8/1983 | Vogelman | 358/135 X |
| 4,494,140 | 1/1985 | Michael | 358/136 X |
| 4,969,042 | 11/1990 | Houtman et al. | 358/903 X |

Primary Examiner—Victor R. Kostak
Attorney, Agent, or Firm—Wenderoth, Lind & Ponack

[57] ABSTRACT

A device which processes a television signal for transmission in which the television signal is divided into horizontal scanning line units, video signals in two consecutive horizontal scanning periods are compared, and when either part or all of these two signals differ, transmits by means of a televison signal transmitter (3, 4, 7A, 7B) only the video signal Vx for that part of the signals which is different, and which uses said transmitted television signal in the television signal receiver (25, 26, 27, 28) to reproduce a complete video signal with all horizontal scanning periods by calculating, mixing, overlaying, or replacing video signal Vx for either part or all of the video signal Vn−1 for the one preceding horizontal scanning period.

26 Claims, 25 Drawing Sheets

TELEVISION SIGNAL PROCESSOR HAVING MEANS FOR COMPARING AND DELETING COINCIDENT VIDEO SIGNAL COMPONENTS FOR TRANSMISSION

TECHNICAL FIELD

The present invention relates to a television signal processing device which can be used for discrete transmission of images in video communications, satellite communications, CATV, and other media.

BACKGROUND ART

In conventional television signal transmission systems, the television signal is transmitted as an uncompressed signal in which no periods are compressed, or as a signal compressed by horizontal scanning line or field units. However, this latter case requires relatively large equipment because all complete signals are compressed before transmission.

Thus, in conventional time axis compression signal transmission methods, the equipment required for transmission and reception is relatively large, making use of this method difficult by any broadcasters other than large-scale broadcasting stations.

DISCLOSURE OF INVENTION

The object of the present invention is therefore to provide a signal processing method which can transmit a television signal in a short real time, and which can simplify the signal processing device required therefor.

The present invention is characterized in that the television signal is divided into horizontal scanning line units, the video signal Vn for the nth horizontal scanning period and the video signal Vn−1 for the (n−1)th horizontal scanning period in one field are compared, and when either part or all of these two signals differ, only video signal Vx for that part of the video signal Vn which differs from the video signal Vn−1 is transmitted as the video signal Vn.

Furthermore, the present invention is characterized by a television signal receiver to which is input the video signal Vn−1 for the (n−1)th horizontal scanning period and the video signal Vx for the nth horizontal scanning period in the television signal transmitted from said television signal transmitter, and reproduces the video signal Vn for the nth horizontal scanning period by calculating, mixing, overlaying, or replacing part or all of the video signal Vn−1 with the video signal Vx.

In addition, the present invention is characterized in that the video signal Vn for the nth frame or field and the video signal Vn−1 for the (n−1)th frame or field in the television signal are compared, and when either part or all of these two signals differ, only video signal Vx for that part of the video signal Vn which differs from the video signal Vn−1, or video signal Vx with the same signal before and after is transmitted in place of the video signal Vn.

With the means according to the present invention, the actual time required for transmission can be shortened and compressed because two consecutive horizontal scanning periods are compared, and instead of transmitting the entire television signal, only that part of the signals which differs is transmitted while that part which is the same is not transmitted. Thus, during the remaining period, another signal can be inserted and transmitted.

Moreover, because the means which determines the signal to be transmitted compares the television signals in two consecutive horizontal scanning periods to detect any difference, it may be achieved with a simple construction, comprising, for example, a transmitter composed of a delay line circuit and comparator and corresponding control circuits, and a receiver composed of a delay line circuit and signal insertion switcher and corresponding control circuits.

In addition, another signal can be inserted and transmitted during the period which would be used to transmit that part of the signal which is the same and does not require transmission, and the signal transmission efficiency and utilization range can be greatly increased.

With a signal processing device according to the present invention, by comparing images in frame or field units and transmitting those parts of the images which differ the data transmission volume can be reduced and the transmission time shortened even with finely patterned images because the images are compared by frame or field units and the same image and video components are removed. Furthermore, the transmission and receiving equipment can be made more compact than conventional equipment because compression and expansion processing is not applied to all of the image information.

MODES FOR CARRYING OUT THE INVENTION

The preferred embodiment of the present invention is described hereinbelow with reference to the accompanying figures.

Figure 1:
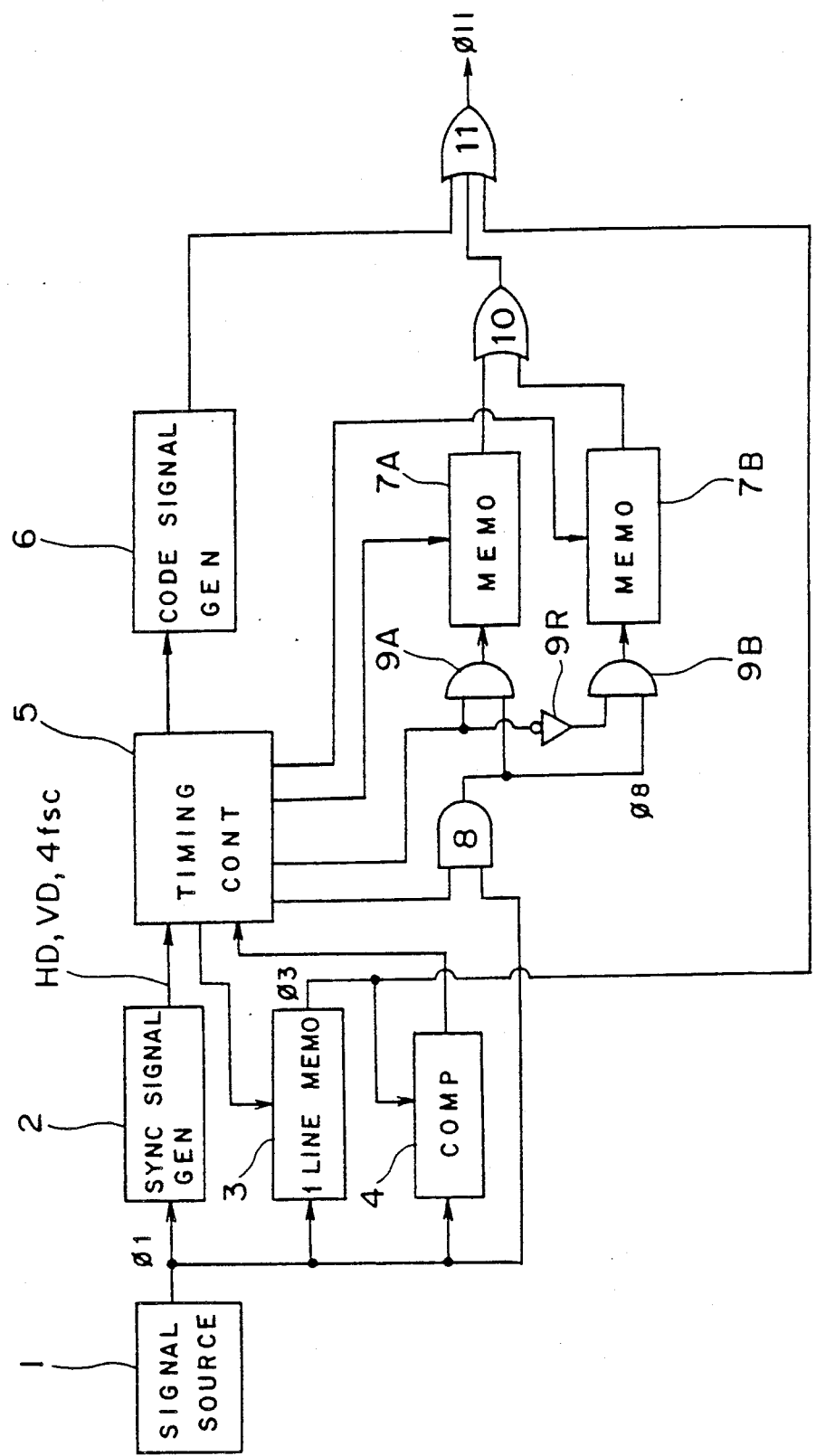
FIG. 1 is a block diagram of the transmitter side of the television signal processor according to a first embodiment of the present invention.

The circuit construction of the preferred embodiment of the signal processing method according to the present invention is shown in FIG. 1. FIG. 1 is a block diagram of the signal processing circuit on the television signal transmission side. In this figure, reference number 1 is the signal source for the television signal, which herein is a signal source for an NTSC television signal $\phi 1$. Reference number 2 is a sync signal regeneration circuit which regenerates the vertical drive signal VD, horizontal drive signal HD, and the chroma subcarrier fsc from the output $\phi 1$ from the signal source 1, and generates a clock signal four times the fsc. This 4fsc clock signal is synchronized with the HD, VD, and fsc.

Figure 2:
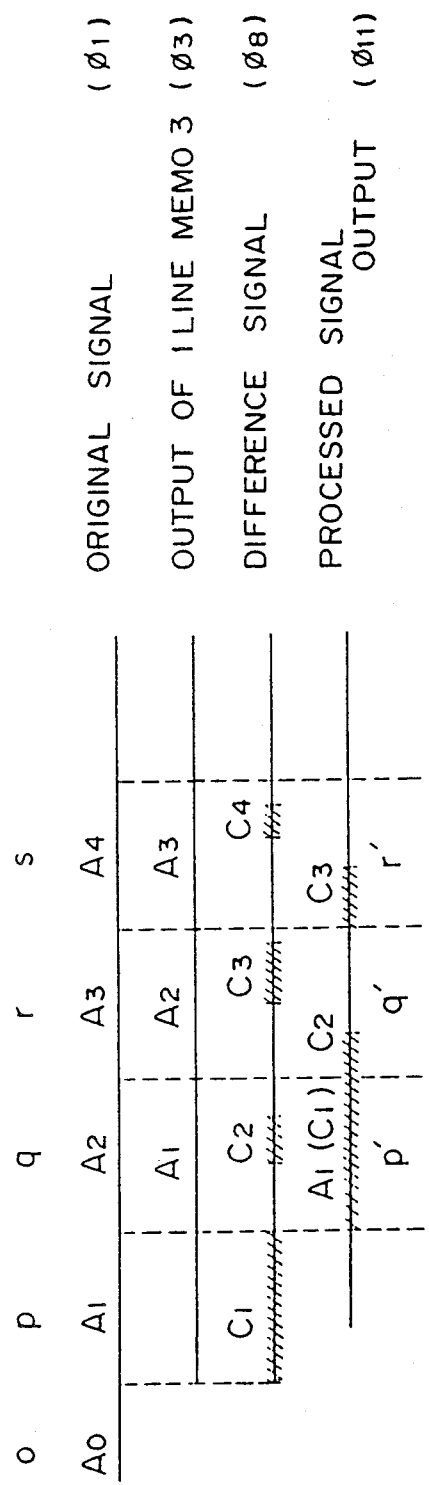
FIGS. 2, 3, 4, and 5 are waveform diagrams for explaining the operation of the television signal transmitter.

Reference number 3 is a one line memory 3, which herein A/D converts the television signal $\phi 1$ and stores therein one line of the digitized signal. The clock signals for the one line memory 3 include the 4fsc and the clock signal synchronized thereto. By storing one line of the signal source 1 output signal $\phi 1$, the output signal $\phi 1$ is delayed one horizontal scanning period (1H) so that the output signal $\phi 3$ of the one line memory 3 and the television signal $\phi 1$ are shifted relative to each other by one horizontal scanning period as shown in FIG. 2. In FIG. 2, o, p, q, r, and s each represent one horizontal scanning period in a single field; in the description hereinbelow, o shall represent the final, i.e., 21st horizontal scanning period (21H), in the vertical fly-back period, p represents the 22H, q the 23H, r the 24H, s the 25H, and so on. The video signal content during each of these periods is represented by A0, A1, A2I.

Reference number 4 is a comparator which compares the output television signal $\phi 1$ from the signal source 1 with the A/D converted, 1H-delayed output television signal $\phi 3$ from the one line memory 3, and during the period in which the two signals are coincident outputs a coincidence signal, e.g., a high level coincidence signal. The output of the comparator 4 varies with the length of one clock unit in the 4fsc clock signal, but timing control circuit 5 ignores short period coincidence signals, and uses only coincidence signals longer than a predefined period to control the AND gate 8.

Figure 3:
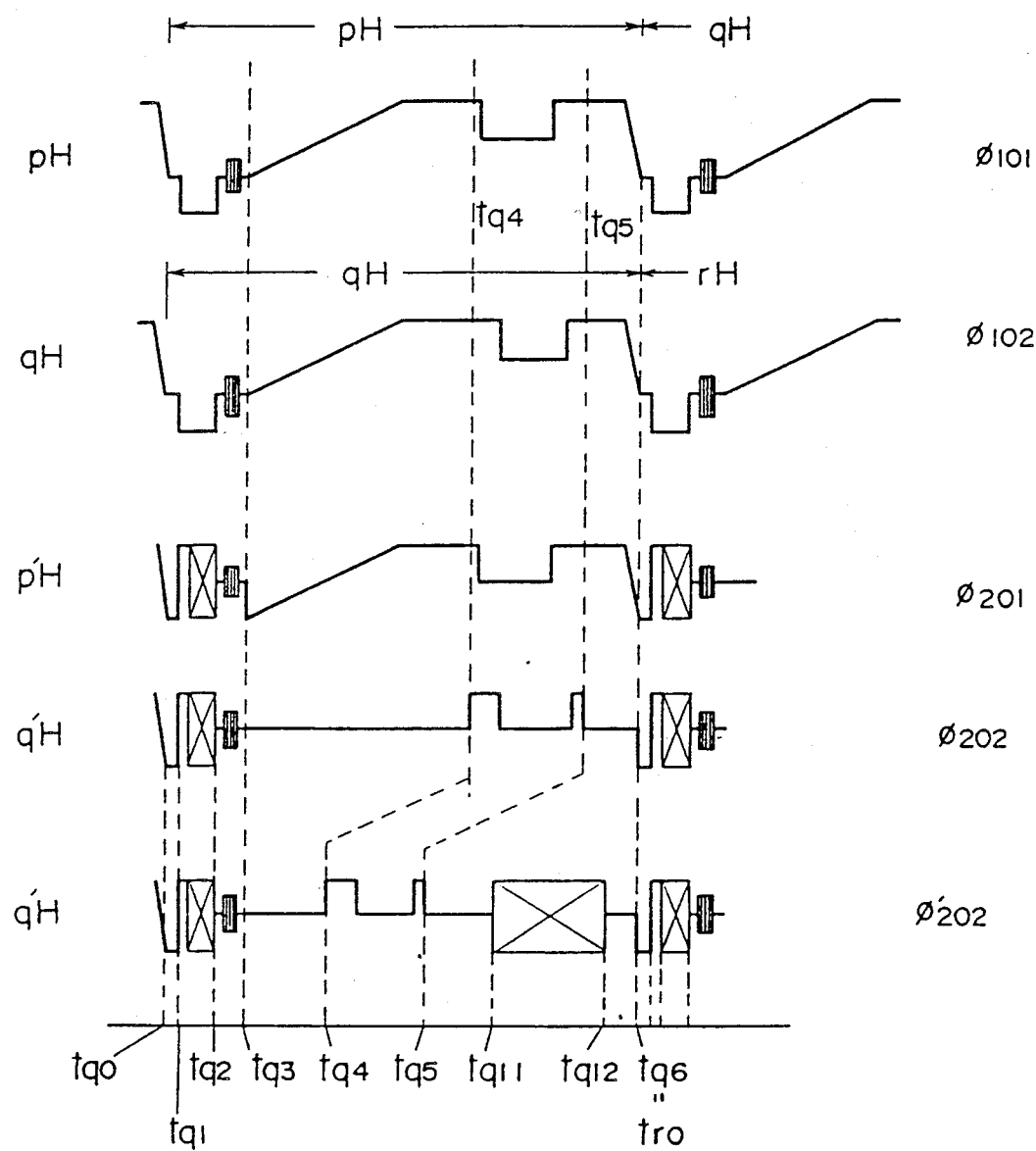

More specifically, in the circuit required to achieve the present invention, because timing control circuit 5 ignores short period coincidence signals and forms a coincidence signal longer than a predefined period, using, for example, a retriggerable multivibrator, the input gate pulse controlling the AND gate 8 can be formed if triggered at the rise of the coincidence pulse in the output of the comparator 4. The output pulse width of the retriggerable multivibrator may be set, for example, at ½ to 1/4H. The result, as shown in FIG. 3, is that a coincidence signal is normally output at periods other than tq4–tq5 during horizontal scanning periods p and q; when a short pulse width coincidence signal is output during periods tq4–tq5, a high level signal is supplied to the AND gate 8 from the timing control circuit 5 during periods tq4–tq5, the output signal from the signal source 1 becomes the output signal from the AND gate 8, and is input to the memory 7A or 7B. (the selected memory is switched at each one horizontal scanning period by the signal from the timing control circuit 5). In other words, this is signal $\phi 8$ shown in FIG. 2; in FIG. 3, during period tq4–tq5 in which there is a difference between the television signals in the one previous horizontal scanning period (p H) and the current horizontal scanning period (q H), the television signal $\phi 8$ in q H is taken as the output signal from the AND gate 8. This signal corresponds to C2 of $\phi 8$ in FIG. 2. In the same way, if the television signals during the q and r horizontal scanning periods are compared and only that part which differs is extracted, the output signal will be that shown by C3 of $\phi 8$ in FIG. 2. This process is repeated for each horizontal scanning period, and only the difference part is passed through the AND gate 8. This is controlled by the timing control circuit 5 using the output from the comparator 4 and the output from the sync signal regeneration circuit 2.

The output from the AND gate 8 is input to the AND gates 9A and 9B. The television signal for the part in which there is a difference between horizontal scanning periods p and r (periods 22H and 24H, i.e., even-numbered scanning periods) is stored in memory 7A through the AND gate 9A. Similarly, the television signal for the part in which there is a difference between horizontal scanning periods o, q, and s (periods 21H, 23H, and 25H, i.e., odd-numbered scanning periods) is stored in memory 7B through the AND gate 9B. In other words, the switch output from the timing control circuit 5 applied to the AND gate 9A and the inverter 9R is a high (low) level on even-number (odd-numbered) horizontal scanning periods, and opens the AND gate 9A (9B), the output of the inverter 9R becomes a low level (high level), and the AND gate 9B (9A) is closed. Therefore, the memory 7A is controlled by the timing control circuit 5 so that it is in a write mode on even-numbered horizontal scanning periods and a read mode on odd-numbered horizontal scanning periods, and the memory 7B is controlled to function in the opposite mode.

Writing to the memory 7B is described next. In FIG. 3, $\phi 101$ and $\phi 102$ are the signals at the p and q horizontal scanning periods; if it is determined by the comparator 4 when television signals $\phi 101$ and $\phi 102$ are compared (corresponding to A2 of $\phi 1$ and A2 of $\phi 3$ in FIG. 2) at the time of q H that there is a difference in the signals at tq4–tq5, the television signal for tq4–tq5, i.e., signal C2 in $\phi 8$ in FIG. 2, is written to the memory 7B at the timing indicated by $\phi 102$. If the memory 7B is a one-line capacity memory and is addressed by row only, the signal is written to the latter half of the one-line memory (the address corresponding to the position of tq4–tq5 in $\phi 102$ in FIG. 3). This write position is stored by the timing control circuit 5, and at r H is read as the signal for q' H as shown by $\phi 11$ in FIG. 2. In other words, as shown by $\phi 1$ in FIG. 2, when all of the signal A1 at p H is different from A0 at o H, the output of the AND gate 8 is C1=A1, i.e., the output signal of the signal source 1 is stored in entirety in the buffer memory 7A, delayed 1 H, and read at q H as the signal of the p' H ($\phi 11$ in FIG. 2). In other words, if in one complete horizontal scanning period the signal differs from that of the previous horizontal scanning period, it is delayed one period and the signal for the one complete horizontal scanning period is output from the OR gate 11 as shown by $\phi1$ and $\phi11$. p', q', and r' of $\phi11$ in FIG. 2 indicate that they are delayed one horizontal scanning period from $\phi1$. The signal stored to the memory 7B at q H is read out at the tq4-tq5 timing of $\phi202$ or $\phi'202$. The read timing from memory 7B may be any desired timing.

A code signal indicating the position of signal C2 during tq4-tq5 in signal A2 of the original horizontal scanning period q, e.g. a code signal indicating the positions of the beginning tq4 and the end tq5, is generated by code signal generator 6; if this code signal is inserted with the horizontal sync pulse and the color burst during tq1-tq3 in FIG. 3, this can be detected at the receiver side, read at the correct timing, and signal A2 can be easily generated from A1 and C2. If this same process is alternately repeated and transmitted for the odd and even lines, signal $\phi11$ in FIG. 2 is obtained. Cl (=A1), C3 ... and C2, C4 ... are alternately stored to buffer memory 7A and buffer memory 7B, respectively.

The formation of $\phi11$ in FIG. 2 is described hereinbelow. At horizontal scanning period r, the output signal of the one line memory 3, i.e., A2 in $\phi3$, and the output signal of the signal source 1, i.e., A3 in $\phi1$, are compared, and that part which is different is passed through the AND gate 8 to store the corresponding part of A3 in the memory 7A, during which time the signal for q' is output from the OR gate 11, i.e., the signal C2 of that part of A2 which differs from A1 is read from the buffer memory 7B. Note that in FIG. 2 the period tq0-tq3 in FIG. 3, i.e., the horizontal fly-back period, is omitted. At horizontal scanning period S, the output signal from the one line memory 3, i.e., A3 in $\phi3$, and the output signal from the signal source 1, i.e., A4 in $\phi1$, are compared; that part of the signals which differs is passed through the AND gate 8, the corresponding part of A4 is stored in the memory 7B, and the signal for r' is output from the OR gate 11, i.e., the signal C3 of that part of A3 which differs from A2 is read from the buffer memory 7A. This process is then repeated. The OR gate 10 passes the output signal from either buffer memory 7A or 7B, the OR gate 11 mixes the output signal from the OR gate 10 and the code signal output from the code signal generator 6, forming the signals $\phi201$, $\phi202$, and $\phi'202$ in FIG. 3.

To explain the process whereby $\phi202$, and $\phi'202$ are formed, the horizontal scanning area outside of tq4-tq5 in $\phi202$ and $\phi'202$ may be either black or white, but is gray (an intermediate value) herein. This level can be set and easily changed by clamping the output of the OR gate 10 and changing the clamp level.

Figure 4:
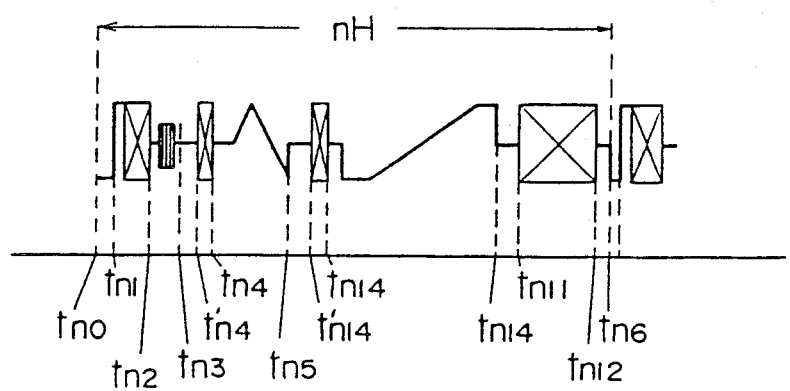

Furthermore, as shown by $\phi'202$, the position of the signal in tq4-tq5 may be shifted from tq3, and the distance of the shift may be varied at every horizontal scanning period. The code signal indicating the distance between tq3-tq4 may be inserted between tq1-tq2. It is also possible to insert and transmit a separate digital or analog signal (tq11-tq12) at some position other than tq3-tq4. In addition, while the signal processing becomes somewhat more complex, multiple signals Cn1, Cn2 may be used for those parts which differ in An and An-1, and the position information for Cn1, Cn2 ... may be encoded and inserted to the signal for a single horizontal scanning period as shown in FIG. 4. In FIG. 4, tn4-tn5 is the position of Cn1, and tn14-ln15 is that of Cn2. The code signal indicating the original position of the Cn1 signal in An is inserted to tn'4-tn4, the code signal indicating the original position of the Cn2 signal in An is inserted to tn'14-tn14, and the receiver uses these code signals to insert Cn1 and Cn2 at the appropriate positions in the original An signal. This is controlled by the timing control circuit 5; in this case the timing control circuit 5 shall contain an MPU.

Figure 5:
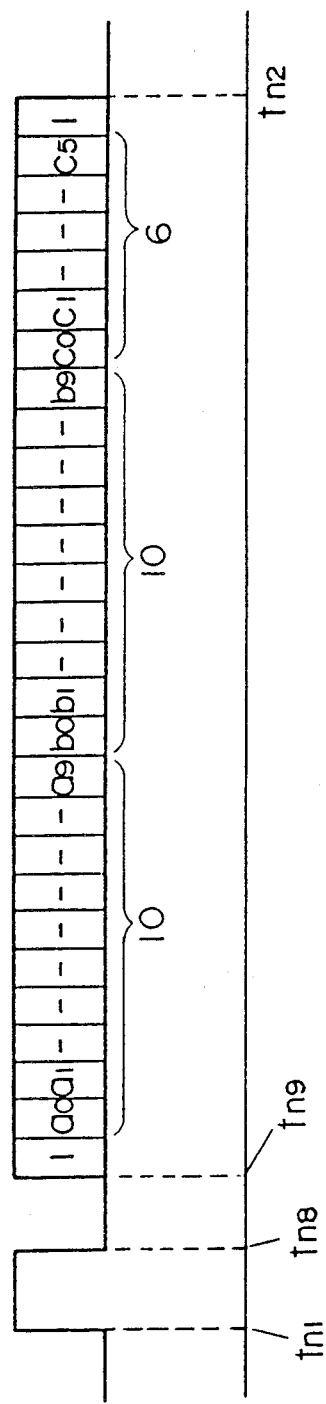

The code signal for a signal indicating difference is described below with reference to FIG. 5 for that case in which there is one code signal in a single horizontal scanning period. In FIG. 5, tn1 and tn2 correspond to tq1 and tq2, respectively. If the signal for one horizontal scanning period is sampled with a 4fsc clock signal, there will be 910 samplings. Even if the sync signal burst signal is excluded, the number of samplings in the horizontal scanning periods from tq3-tq6 will be 512 or greater, thus requiring a 10-bit address signal. As shown in FIG. 5, the ten bits a0-a9 express the position of tq4 in $\phi201$, and the ten bits b0-b9 express the position of tq5 in $\phi201$. The six bits c0-c6 indicate the position of tq4 in $\phi,202$ in 16 clock units of the 4fsc. Specifically, as shown by $\phi,202$, when the signal at tq4-tq5 is time shifted, because no problems arise for practical utility even at the roughness of 16 clock units of the 4fsc (approx. 1.1 $\mu$sec.), only six bits are used here in order to reduce the number of bits. Adding one start and stop bit before and after, respectively, a0-c5 results in a total 28 bits. If the width of one bit is $1/fsc \approx 139.7$ nsec, then $28 \times 139.7 \approx 3.92$ $\mu$sec. Thus, most of the NTSC sync signal can be apportioned to these 28 bits, and as shown in FIG. 5 a horizontal sync trigger can be inserted to tn1-tn8.

The sync signal and burst signal may be consecutively transmitted before and after a0-c5 from the code signal generator 6.

In FIG. 4, tn'4-tn4 is unnecessary, and the 28 bits may be inserted at tn'14-tn14. Thus, if the difference between the signals for the previous horizontal scanning period and the current horizontal scanning period is transmitted and received and the remaining common portion of the signals is not transmitted, other signals may be inserted to tq11-tq12 as shown by $\phi'202$ in FIG. 3 for a significant portion of the horizontal scanning periods in one field. Because a typical television signal contains a significant amount of common signals, those signals which do not need to be synchronized can be transmitted during tq11-tq12 in $\phi'202$ in FIG. 3. These additional signals can be generated by an additional signal generator circuit (not shown) controlled by the output of the timing control circuit 5, and supplied to the OR gate 11 for transmission. While this signal format cannot be received by a common home receiver, it is a convenient means of sending and receiving signals in which the sender and receiver correspond in a one-to-one basis as in satellite communications and CATV. For example, if a specific algorithm is applied to the bits in a0-a9, b0-b9, and c0-c5 in FIG. 5, and a discrete algorithm is used by each receiver to decode the received signal, the confidentiality of communications can be maintained. Furthermore, information relating to the algorithm can also be inserted to tq11-tq12 for transmission and reception.

Thus, by applying the signal processor according to the above embodiment, the transmitter can compress the amount of transmission data for the television signal using a delay line, the receiver can reproduce the original signal with a virtually identical circuit construction, and the circuit construction can thus be simplified. In addition, the transmission contents can be encoded so that they can be understood only by one specified receiving party and not understood by other parties. Moreover, other digital and analog signals can also be easily transmitted together with the television signal (video).

Thus, using the signal processing circuit shown in FIG. 1, the television signal which has been compressed and to which has been added other data signals is frequency converted and transmitted at a level compatible with satellite communications, CATV, and similar broadcasting formats. For example, if satellite broadcasting is used, the signal could be transmitted as a 27-MHz bandwidth, 36-MHz Ku band signal, or a 100-MHz bandwidth Ka band signal.

Figure 6:
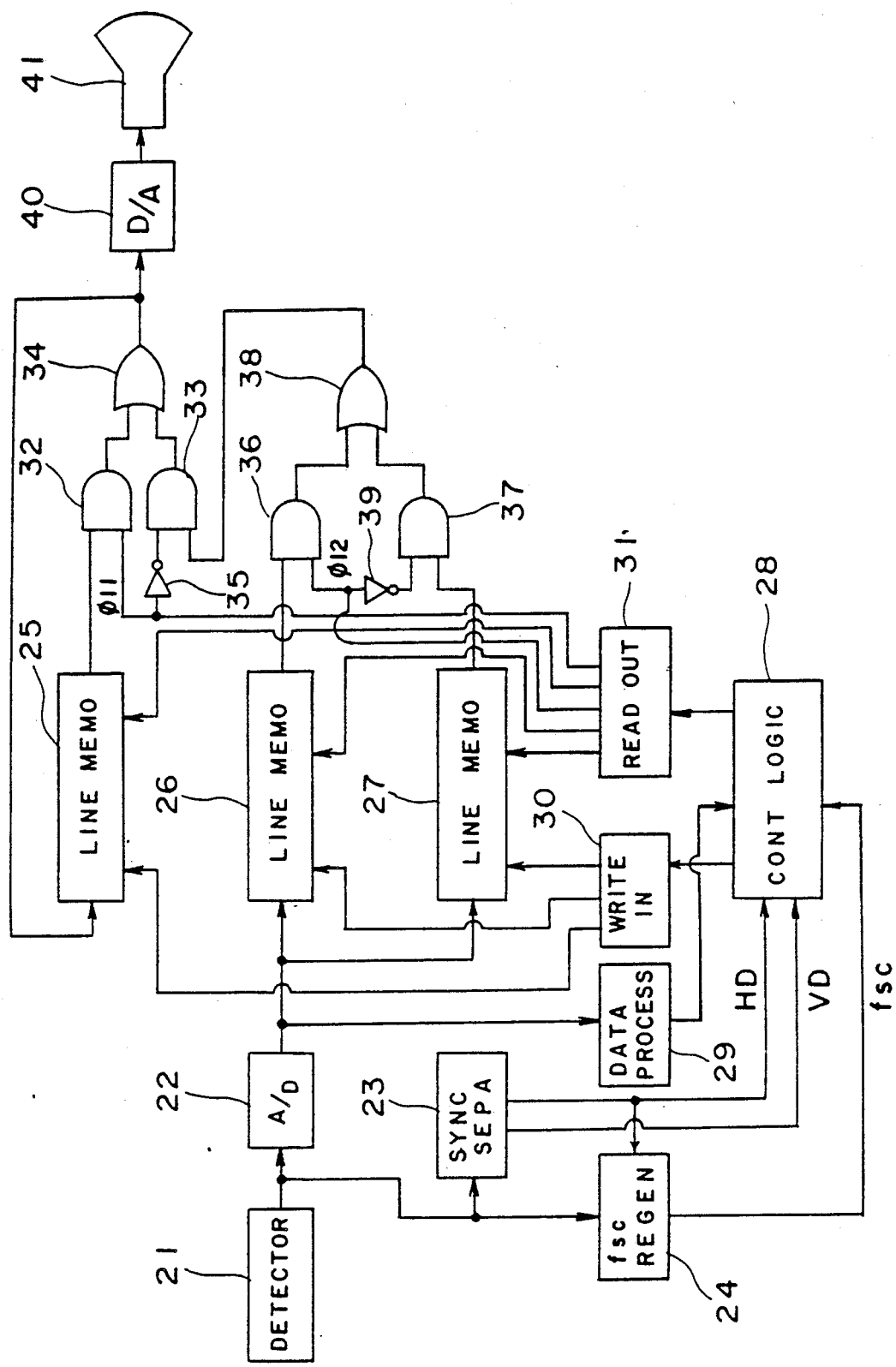
FIG. 6 is a block diagram of the receiver side of the television signal processor according to a first embodiment of the present invention.

The receiver which is used to receive the television signal broadcast from the above transmitter is described hereinbelow. The broadcast signal is converted from the Ku band or Ka band frequency, for example, if broadcast by satellite, to the frequency level of the original UHF or VHF signal, and input to the receiver shown in FIG. 6. FIG. 6 is a block diagram of the television receiver according to a first embodiment of the present invention. In FIG. 6, 21 is a video detector circuit and 22 is an A/D convertor. The television signal input to the video detector circuit 21 is, as shown by $\phi'202$ in FIG. 3, a compressed video signal from which those parts of the video signal in one field which are the same as parts of the video signal for the one previous field are removed. Furthermore, as shown by $\phi'202$ in FIG. 3, a code signal indicating the position in signal A2 during the original horizontal scanning period q of the video signal C2 differing at period tq4-tq5 is inserted at time tq1-tq2. A code signal indicating the timing at which the video signal for tq4-tq5 in this signal $\phi'202$ is also inserted to period tq1-tq2.

As described above, the television signal comprising the compressed video signal and the code signal is supplied from the video detector circuit 21 to the synchronous separation circuit 23 and chroma subcarrier (fsc) regenerator 24; the horizontal sync signal (drive signal) HD and the vertical sync signal (drive signal) VD are output from the synchronous separation circuit 23, and the chroma subcarrier fsc is output from the fsc regenerator 24. The horizontal and vertical sync signals HD and VD, and the chroma subcarrier fsc are all input to the control logic circuit 28 as will be described below. Note that the synchronous separation circuit 23 and the fsc regenerator 24 are devices of common knowledge, and further detailed description thereof is thus omitted below.

The television signal output from the video detector circuit 21 is converted to a digital signal by the A/D convertor 22, and output to the first and second line memories 26, 27. This digital television signal is input to the data processing circuit 29, where the code signal for one field is extracted and sent to the control logic circuit 28. Thus, as stated above, the horizontal and vertical sync signals HD and VD from the synchronous separation circuit 23 and the chroma subcarrier fsc from the fsc regenerator 24 are input to the control logic circuit 28 with the code signal from the data processing circuit 29; the control logic circuit 28 outputs a control signal to controllers 30, 31 so that the write clock and the read clock are output from the write controller 30 and the read controller 31, respectively; the write clock and read clock are the triggers for writing and reading the video signal to the first, second, and third line memories 26, 27, 25, respectively, based on the timing information, the timing clock reference of which is the horizontal sync signal HD. In FIG. 6, 32, 33, 36, and 37 are AND gates, 34 and 38 are OR gates, 35 and 39 are inverters, 40 is a regeneration circuit which comprises a D/A convertor for digital-analog conversion of the digital television signal output from the OR gate 14, and 41 is a cathode ray tube (CRT) on which is displayed the regenerated output television signal from the D/A convertor-regeneration circuit 40.

The operation of a receiver according to the preferred embodiment of the present invention as thus described is described hereinbelow with reference to FIG. 7 and FIG. 8.

Figure 7:
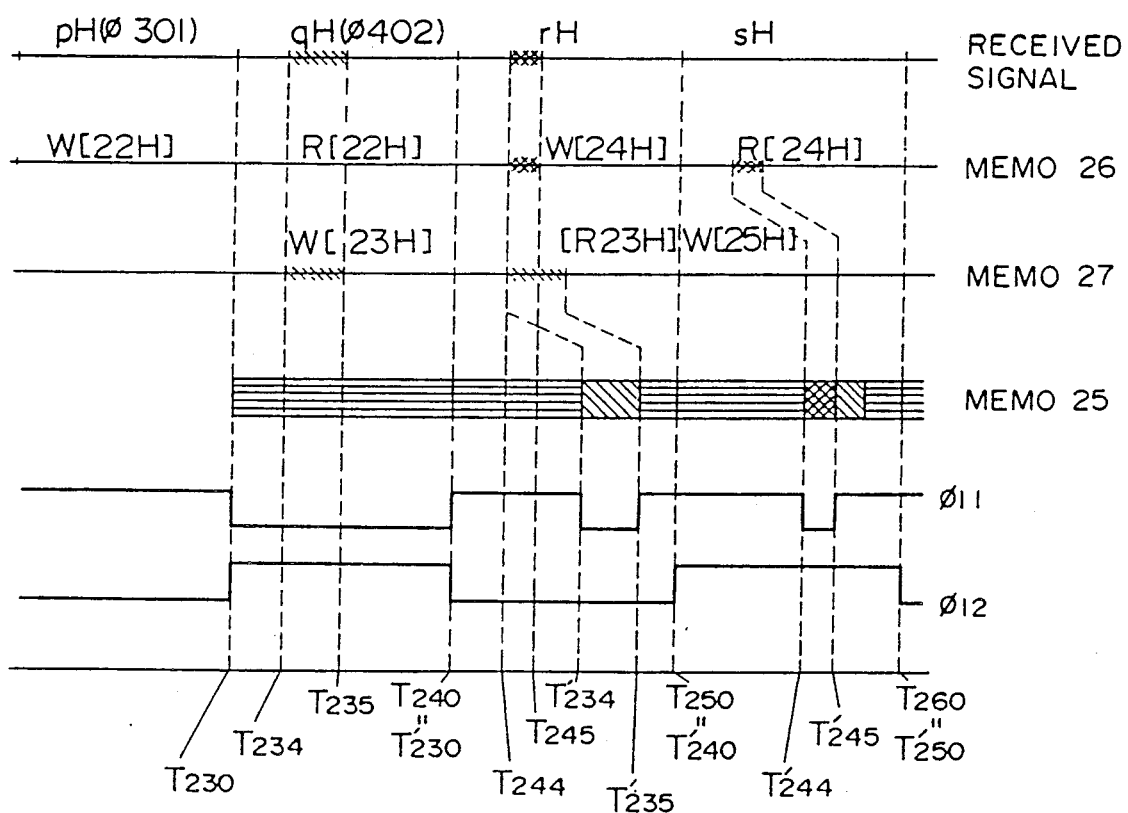
FIGS. 7, 8, and 9 are waveform diagrams for explaining the operation of the television signal receiver.
Figure 8:
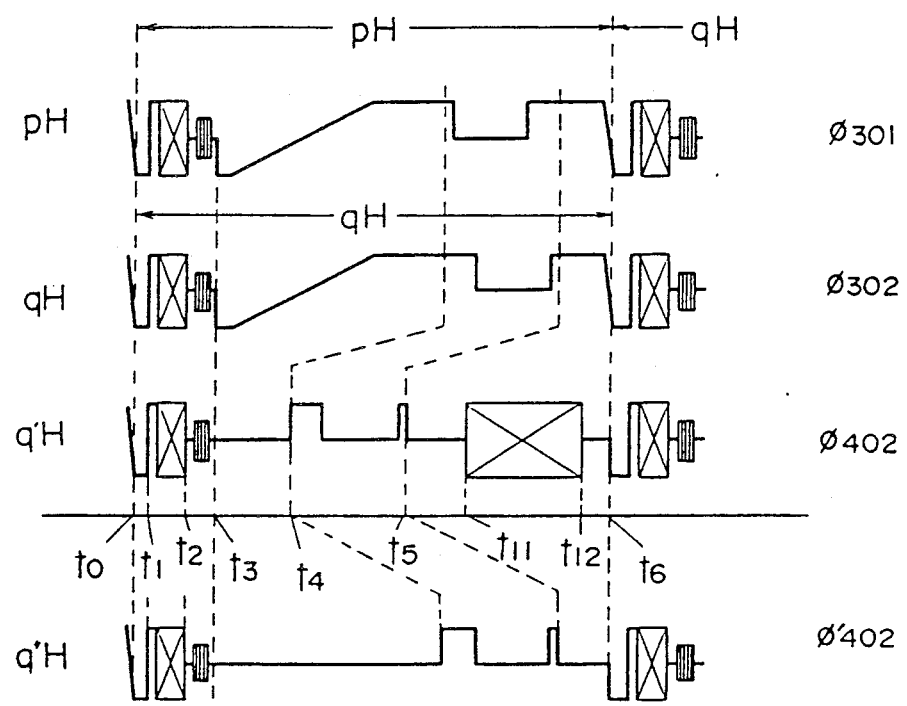

In FIG. 7 and FIG. 8, 0H (horizontal scanning period 21H) in the reception signal is preceded by the vertical blanking period (VBL), and the video signal begins from pH (22H). Note that this video signal is shown to compare with the video signal from the transmitter as shown in FIG. 3.

The signal for 21H in the video signal input to the video detector circuit 21 is first written to the line memory 25, at which time the video signal from the A/D convertor 22 is supplied to the line memory 26. A code for zero is written to the line memory 25 indicating that the signal component for period t3-t6 in 21H, or the video signal component from the control logic circuit 28 is not present.

A code signal indicating the timing at which the video signal which differs from the video signal in 21H is inserted in 22H is inserted to period t1-t2 in the partially compressed signal $\phi301$ ($\phi201$ in FIG. 3) of 22H as described hereinabove with respect to the transmitter in the preferred embodiment of the present invention; this code signal is extracted from signal $\phi301$ by the data processing circuit 29, sent to the control logic circuit 28, and a control signal is supplied from the control logic circuit 28 to control the write controller 30 so that a high level signal (write clock) causing a write operation to be performed to the line memory 26 during t3-t6 in 22H is output from the write controller 30. The result is that the 22H video signal component (period t3-t6) $\phi301$ is written to the line memory 26 at 22H as shown in FIG. 7. Note that period t1-t3 is a 1-bit 8 $\tau$ long code signal when $\tau = \frac{1}{4}$ fsc.

Also at 22H, a control signal is supplied from the control logic circuit 28 to the read controller 31 to start a drive state, and a read clock is supplied from the read controller 31 to the line memory 25. Furthermore, the AND gate 32 is opened by the output from the read controller 31, and AND gate 33 is closed by the inverted output of the inverter 35. Thus, the output of the OR gate 34 is zero because the contents of the line memory 25 are output during 22H, and zero data is newly written through the feedback loop. Note that the write clock is supplied from the write controller 30 to the line memory 25 during period t3-t6 from 22H to 262H (or 263H).

That case in which the signal at 23H ($\phi402$ in FIG. 8) is received is described next. In this description, however, the phase difference between the output of line memory 26 and the input of the write clock to line memory 25 shall not be considered. The technique whereby a phase difference is provided in the transfer of data from one memory area to another is common knowledge, and further description is omitted hereinbelow.

The 23H video signal ($\phi$402 in FIG. 8) transmitted from the transmitter and indicating the difference component of the 22H video signal and the 23H video signal before compression is put through the video detector circuit 21 and the A/D convertor 22, as was the previous 22H signal, but the video signal component (the t3-t6 component of $\phi$402) is this time written to line memory 27. While the 23H video signal is written to the line memory 27, the video signal ($\phi$301) written in 22H is read from line memory 26. At this time, the signal in line memory 26 (t3-t6 in video signal $\phi$301) is controlled so that the complete signal is transferred to line memory 25 and output based on the 22H code signal (t1-t2) stored in the memory area (not shown) of the control logic circuit 28.

Specifically, a low level signal ($\phi$11 in FIG. 6) is supplied from the read controller 31 to the AND gate 32, and the AND gate 32 is thus closed. Also, the output of the inverter 35 becomes the inverse of the $\phi$11 signal, i.e., a high level signal, and the AND gate 33 is opened. Similarly, the high level control signal $\phi$12 from the read controller 31 is supplied to the AND gate 36, and the AND gate 36 opens. The output of the inverter 39 which is inverted signal $\phi$12 causes AND gate 37 to close. Therefore, the output of the OR gate 38 becomes the output of the line memory 26 from T230-T240 in FIG. 7. The read clock is, of course supplied continuously to the line memory 26 during this period.

Thus, the received signal is read in 23H, i.e., the video signal $\phi$402 from t3-t6 in FIG. 8 and the video signal $\phi$301 from t3-t6 from the line memory 26 from T230-T240 in FIG. 7, from the line memory 26 and input sequentially to AND gate 36, OR gate 38, AND gate 33, and OR gate 34, from which it is input to the D/A convertor-regeneration circuit 40 for conversion to an analog video signal which is output to the CRT 41. At this time, the output of the OR gate 34, i.e., video signal $\phi$301 from t3-t6, passes the feedback loop and is written to line memory 25.

It should be noted with respect to FIG. 7 that T230 in FIG. 7 corresponds to time t0 in 23H, but the signal from t0-t3 is not shown in FIG. 7. This omission has absolutely no bearing on the description of the operation of the preferred embodiment. This is also true for 24H, 25H, and successive periods.

The operation when the 24H signal is input as the reception signal is described next. The waveform of the 24H input signal is not shown in the figures.

The video signal at 24H (T240-T250 in FIG. 7) is written to the line memory 26 according to the write control of the control logic circuit 28. At this time, the control signal $\phi$12 from the read controller 31 is a low level signal. Thus, the low level signal $\phi$12 closes the AND gate 36 and opens the AND gate 37 in 24H.

The 23H reception signal contains a code signal at t1-t2 in signal $\phi$402 indicating at what timing in 23H the video signal is inserted (in FIG. 7 and FIG. 8 this would be read at 24H). This code signal is interpreted by the data processing circuit 29 as described hereinabove, and as the result, a control signal is input from the control logic circuit 28 to the write controller 30 and the read controller 31, the clocks from these controllers are output to the line memories 25, 26, 27, and the control signal shown in FIG. 7 is output from the read controller 31 to the gates or the inverters 32, 33, 35, 36, 37, and 39.

Based on this code signal, a read clock is supplied to the line memory 27 only during T'234-T'235 in FIG. 7 during 24H, and a read clock is supplied to the line memory 25 from T240 (=T'230)-T250 (=T'240), except during the period T'234-T'235.

The control signal $\phi$11 during 24H is a high level signal at T240-T'234 and T'235-T250, and a low level signal from T'234-T'235 based on the 23H code signal stored in the memory area of the control logic circuit 28.

Thus, during T240-T'234, the AND gate 32 is open and the AND gate 33 is closed by the control signal $\phi$11, and the signal read from the line memory 25 to which the read clock is supplied, i.e., the $\phi$301 video signal at t3-t4 in FIG. 8, is output from the line memory 25 through the AND gate 32, OR gate 34, and D/A convertor-regeneration circuit 40, to the CRT 41.

Next, during T'234-T'235, the low level control signal $\phi$11 closes AND gate 32 and opens AND gate 33. Thus, the signal read from the line memory 27 to which the read clock is supplied during T'234-T'235, i.e., the $\phi$402 video signal at t4-t5 in FIG. 8, is output through the AND gate 37, OR gate 38, AND gate 33, OR gate 34, and D/A convertor-regeneration circuit 40, to the CRT 41. The signal read from the line memory 27 passes the feedback loop and is written to the line memory 25 as was described for the previous case hereinabove.

Next, during T'235 T'250, the high level control signal $\phi$11 opens AND gate 32 and closes AND gate 33; the signal read from the line memory 25 to which the read clock is supplied, i.e., the $\phi$301 video signal at t5-t6 in FIG. 8, is $\phi$ut from the line memory 25 through the AND gate 32, OR gate 34, and D/A convertor-regeneration circuit 40, to the CRT 41. The video signal read from the line memory 25 passes the feedback loop and is written to the line memory 25 as was described for the previous case hereinabove.

As thus described, the source signal for 23H which differs from the signal received at 22H only with respect to the t3-t4 component of the $\phi$402 signal in FIG. 8 is restored in 24H as shown by $\phi$302 in FIG. 8. Note that the content of the line memory 25 at this time is the video signal for t3-t6 of $\phi$301 in FIG. 8 during 23H (the horizontal line portion of T230-T240 in line memory 25 in FIG. 7), and at 24H, the memory contents at 23H are rewritten with the video signal for t4-t5 of $\phi$402 in FIG. 8 (the area shaded by diagonal lines at T'234-T'235 in line memory 25 in FIG. 7).

The line memory 26, however, is set to the write state as described above, and is written with the 24H reception signal. Thus, the signal indicating the difference between the 23H video source signal and the 24H video source signal (the crosshatch area at 24H in the reception signal in FIG. 7) is written to the line memory 26.

The video source signal of 24H is restored at 25H with the same operation used to restore the 23H video source signal at 24H, and by repeating this operation at each horizontal scanning period the original image can be restored and reproduced on the CRT 41.

A sample code signal, e.g., the code signal inserted to t1-t2 in $\phi$301 and $\phi$402 in FIG. 8, contained in the signal received by the receiver is described below with reference to FIG. 9.

Figure 9:
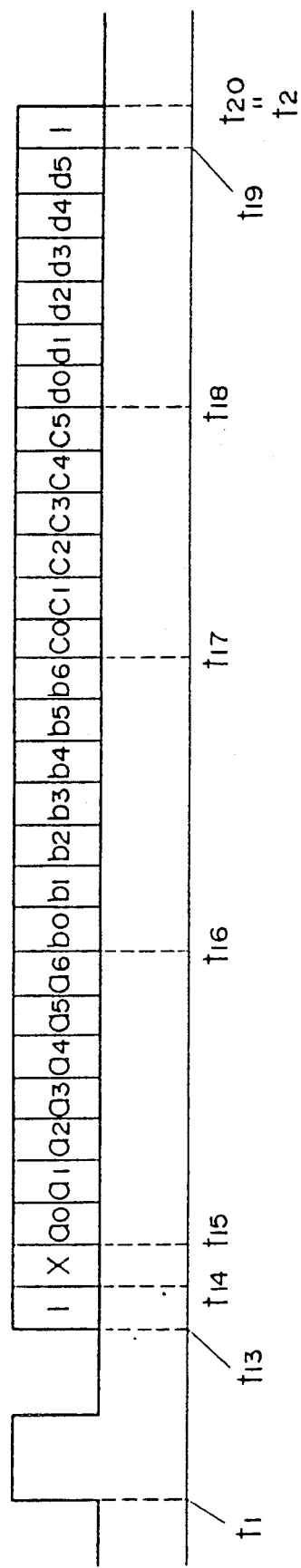

In FIG. 9, t1-t13 is a horizontal sync signal comprising a series of ones and zeroes, and the code signal comprises t13-t20. Note that t20 in FIG. 9 corresponds to time t2 in FIG. 8. The R1S after t13 is the start bit, which is always a R1S. The next RxS identifies whether that line signal is a signal in which is contained a part of the video source signal (partial signal), or is a signal which contains a complete video source signal (complete signal). For example, a R0S here may indicate a partial signal, and a R1S may indicate a complete signal. In the embodiment described hereinabove, this R×S bit is a 1 for signal φ301 in 22H, and is 0 in the received signals of 23H and 24H. The seven bits at a0-a6 following the R×S bit compose the code identifying the timing at which the beginning of the video signal is positioned in the television signal restored by the receiver, and may be a code expressing, for example, the length from t1 to t4 in φ302 in FIG. 8. The seven bits b0-b6 following the a0-a6 bit code compose the code identifying the timing at which the end of the video signal is positioned in the television signal restored by the receiver, and may be a code expressing, for example, the length from t1 to t5 in φ302 in FIG. 8. The six bits c0-b5 following the b0-b6 bit code compose the code identifying the timing at which the beginning of the video signal is positioned in the television signal partially omitted by the transmitter, and may be a code expressing, for example, the length from t1 to t4 in φ402 in FIG. 8. The six bits d0-d5 following the c0-c5 bit code compose the code identifying the timing at which the beginning of another data code signal is positioned in the television signal partially compressed by the transmitter, and may be a code expressing, for example, the length from t1 to t11 in φ402 in FIG. 8. The R1S between t19 and t20 is the stop bit.

One horizontal scanning period (1H) from t0 to t6 in the television signal shown in FIG. 8 is approximately 63.5 μs in an NTSC signal, and if this is sampled at 4fsc, there will be 910 samplings. Therefore, there will be no problems for practical use even if t1-t5 is expressed with seven bits, removing the lowest three bits t1-t6. Also, from t1-t11, the lowest four of the ten bits are dropped and the highest six bits are determined at (1/4fsc) ×16≈1.12 μs. While it is preferable to determine t1-t5 and t1-t6 according to the screen at each sampling point, setting these every eighth sampling unit (approximately 0.56 μs) presents no problems in practical use. Because it is not necessary to precisely identify the position of other data at t11-t12 and it is sufficient to know the position of t11, this is determined every 16th sampling unit. In the data processing circuit 29 in FIG. 6, the data at t13-t19 and at t11-t12 is extracted and processed. The data at t11-t12 contains either a code indicating the data length, or start and stop bits. It should be further noted that as shown in FIG. 9, t1-t15 is 32 times t14-t15, and if t14-t15 is ½ fsc ≈ 139.5 nsec., then 32×139.7 nsec. ≈4.47 μs, and can thus be held to the width of the NTSC horizontal sync signal. Therefore, even if the color burst is not moved, the horizontal sync signal may be written to t1-t15 in FIG. 9. The highest frequency component of t13-t20 is the fsc, and is thus within the transmission bandwidth of the normal NTSC signal (on a normal television the amplitude will be ½, but this poses no problems in signal processing).

According to the preferred embodiment of the present invention as described hereinabove, even if only a signal containing that part which differs from the preceding line is received, the source image on the transmitting side can be accurately reproduced on the receiving side. Moreover, in this case confidential communications (images) can be transmitted by applying specific processing to the bits a0-a6, b0-b6, c0-c5, and d0-d5 in FIG. 9 and informing only the intended recipient of the required conversion procedure.

The description of the preferred embodiment hereinabove is concerned specifically the signal processing as it applied to line units, but it is also possible to replace the line memories in FIG. 6 with field memories or frame memories and apply this same processing in field or frame units, and it is also possible to combined line unit processing with field or frame unit processing.

An alternative embodiment in which this same processing is applied to field or frame units is described hereinbelow with reference to FIG. 10.

Figure 10A:
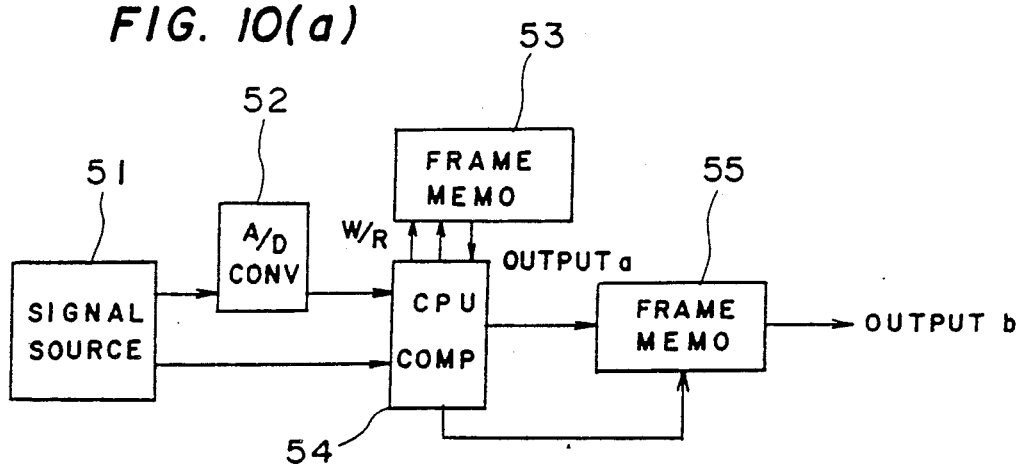
FIG. 10(a) is a block diagram of the transmitter used to achieve the signal processor in an alternative, embodiment of the present invention

In FIG. 10(a), reference number 51 is a signal source, and may be a camera, video tape recorder, or other device. Reference number 52 is an analog/digital (A/D) convertor, which digitizes the analog video signal from the signal source 51; in this embodiment it converts the signal to an 8-bit digital value. Reference number 54 is a comparator/control circuit, and is composed of a microprocessor (CPU). This CPU 54 compares and outputs in 8-bit units the image in the nth frame (herein the second frame) as shown in FIG. 10(c) which has been digitized by the A/D convertor 52 with the image from the (n−1)th frame (herein the first frame) already stored in the frame memory 53, and controls reading and writing to the frame memory 53 to write the comparison processed image data to the frame memory 53 and read the image data stored in the frame memory 53. In the comparison processing of the image data, the data at the LSB 1 bit in the output from the A/D convertor 52 and the output from the frame memory 53 is ignored in order to avoid the affects of quantization noise.

Figure 10B:
FIGS. 10(b) and 10(c) are plan views to explain the operation thereof.
Figure 10C:
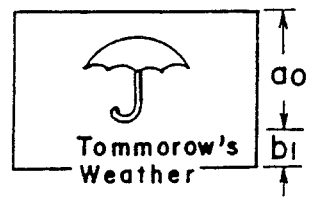
Figure 11:
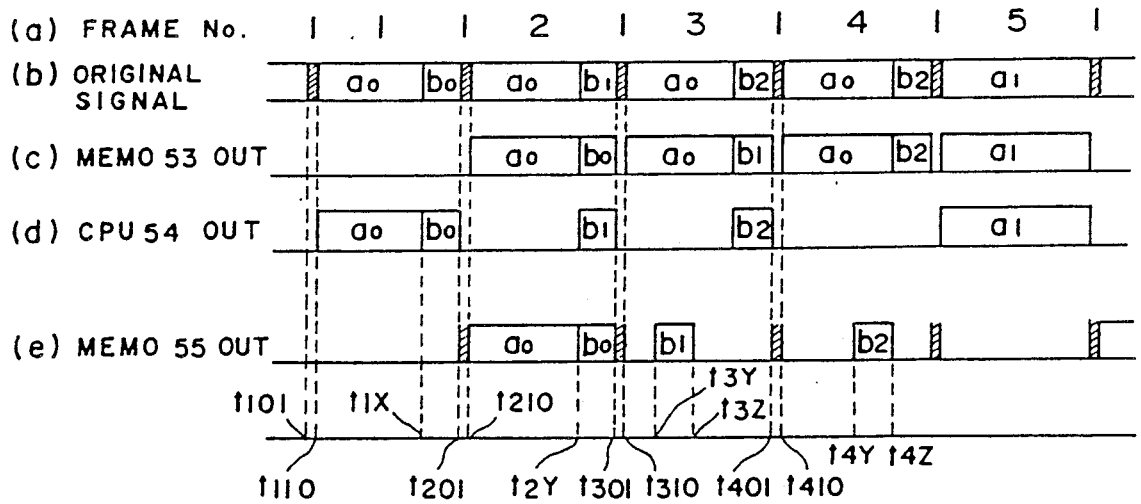
FIG. 11 is a waveform diagram to describe the operation of the signal processor shown in FIG. 10(a)

As shown in FIG. 10 (b) and (c), the images in the first and second frames differ in the text portion, which reads "Today's Weather" and "Tomorrow's Weather" respectively; the operation is described below for that case in which frame 3 and frame 4 differ from each other and from frame 2 in the text component only, and frame 5 is a completely different image as shown in FIG. 11.

When the source signal (a0 +b0) for frame 1 is input from the signal source 51, A/D converted, and input to the CPU 54, the digital source signal (a0+b0) is written to the frame memory 53 and output because there was no previous image and there is therefore no image data in the frame memory 53. The digital signal (a0+b0) output from the CPU 54 is input to the frame memory 55, and a code signal indicating that the signal is a new image signal output from the CPU 54, i.e., that the image signal is completely different from the image in the preceding frame, is input at the vertical fly-back period (t201-t210). This code signal shall conform to a new format used for encoded text transmissions. Using this new format, the 190 bit data including the error correction bit can be transmitted in 1φ. In the signal processing method according to the present invention, the data code can be sufficiently transmitted by using this new format. The image signal to which this code signal has been inserted is delayed by one frame to the source signal, and is output at frame 2.

When the source signal (a0+b1) for frame 2 is input to the CPU 54, a read command is output from the CPU 54 to the frame memory 53 to which the previous image data (a0+b0) has been written, and the previous image signal is read into the CPU 54. Because the text component (b0 and b1) differs in the image data (a0+b0) and the source signal (a0+b1), the comparison output from the CPU 54 is the image data (b1). This image data (b1) output from the CPU 54 is written to the frame memory 53 as was frame 1. The write processing of the image data (b1) to the frame memory 53 is sufficient if it actually changes part of the data (b0) in the original image data (a0+b0) to the new data (b1). The image data (b1) is sent from the CPU 54 to the frame memory 55 where a code signal indicating that the image data differs in part from the image in the previous frame is inserted to the vertical fly-back period (t301-t310). Note that when the image signal (b1) to which is inserted this code signal is read from the frame memory 55 at the timing for frame 3, this timing may be of two types: that in which the image component (b1) in frame 2 is sent literally at a given timing, and that in which the image signal (b1) is sent at a relatively early timing. Specifically, when the image signal (b1) of frame 2 is sent at frame 3, it is sent at an early period in frame 3 (t3y -t3z).

Thereafter, the source signals (a0+b2) and (a0 +b2) input at frame 3 and frame 4 ar compared with the image signals in the preceding frame (a0+b1) and (a0+b2); image signal (b2) is sent as shown in FIG. 11 at the timing of frame 4 for the source signal (a0+b2) of frame 3, and a zero signal is sent at the timing of frame 5 for the source signal (a0+b2) of frame 4. Moreover, because the input source signal at frame 5 (al) is completely different from the input source signal of the previous frame (a0+b2), the image data (a1) is written to the frame memory 53, and the code signal is sent from the frame memory 55 at the timing of frame 6.

Applying the signal processing method for the embodiment described hereinabove, by comparing images with extremely fine, detailed patterns in frame units and sending only that part of the image which differs, the amount of information which can be omitted from the transmission can be increased when compared on a frame-by-frame basis even with images in which there are few identical parts when compared on the basis of adjacent horizontal lines, and the transmission time can thereby be shortened.

Furthermore, by encoding the code signal carrying the information identifying the timing t3y, t4y . . . tny at which the comparison-compressed image signal is transmitted so that only a contracted receiver can read the signal and varying irregularly the timing tny, third parties can be prevented from reading the contents, thereby enabling transmission and delivery of information only to specified contract parties, and this method can thus be used for confidential communications.

As will also be known from FIG. 11, because the periods in which images are not transmitted increase, other information can be inserted in open periods, and the transmission efficiency can be increased.

However, in this case, because the 4.5 MHz audio subcarrier cannot be used with an NTSC television signal, the audio signal can also be digitized and multiplexed or inserted to the vertical fly-back period or horizontal fly-back period for transmission.

The output of the frame memory 55 is compared as described above on a frame unit basis, and the image signal for the difference component is output together with a data signal, but when the image of a given frame is completely different from the image in the preceding frame, it is necessary to transmit the image signal for the complete frame and it is not possible to reduce the amount of transmission information. One means of resolving this inconvenience is to use both of the signal processing methods proposed with respect to the first embodiment of the present invention (FIG. 1). One embodiment in which both of these signal processing methods are used at the same time is described with reference to FIG. 12 and FIG. 13.

In this alternative embodiment, the output signal from the frame memory 55 (FIG. 10) is input to the one line memory 57 and to comparator 56. An image signal for one frame with no new deleted components is output from the frame memory 55, and the image signal shown at FIG. 13 (a) is input sequentially one horizontal line at a time to the one line memory 57 and the comparator 56 as is described below. Note that the source signal at FIG. 13 (a) is a null (no image) signal to 20H, and is described as the vertical fly-back period.

Figure 13:
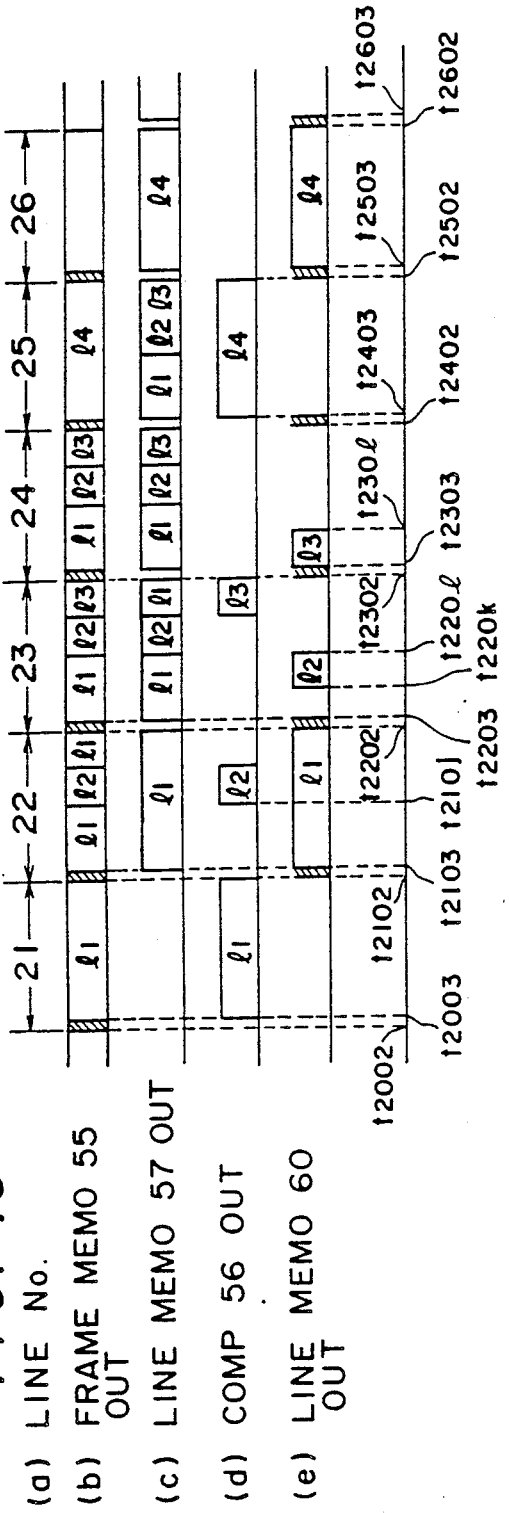
FIG. 13 is a waveform diagram of the signal processor shown in FIG. 12.

The image signal input at 21H in FIG. 13 is input to the comparator 56 and the one line memory 57 as described above. Synchronized to the input timing of this image signal at 21H, the 20H image signal written to the one line memory 57 in the one preceding horizontal scanning period (1H) is read into the comparator 56, where the 20H image signal (null signal) and the 21H image signal are compared; the image signal for the difference component of these two signals, i.e., the entire image signal with respect to the 21H image signal, is output to the one line delay circuit 60. The comparator 56, one line memory 57, and one line delay circuit 60 are driven by the control logic circuit 58, and the drive clock for this control logic circuit 58 is the sync signal obtained by supplying the signal from the signal source 51 to the synchronous separation circuit 59.

Next at 22H, the 2HH image signal ($\phi$1) and the image signal for the difference component (1 2) are supplied to the comparator 56 and the on line memory 57. In the comparator 56, the 21H image signal ($\phi$1) and the 22H image signal (l 1+l 2) are compared, and the comparator 56 outputs only that component (l 2) which differs in the two signals. When this difference component (l 2) is output to the one line delay circuit 60 from the comparator 56, the control logic circuit 58 generates a code signal indicating the timing (t201j) of the signal component (l 2) in 22H, and a code signal indicating the timing of the beginning (t220k) and the end (t220 l) of the signal component (l 2) when the signal is output from the one line delay circuit 60, and inserts these code signals to the horizontal fly-back period (t2202-t2203). The timing of the output from the one line delay circuit 60, of course, corresponds to the code signal generated by the control logic circuit 58. The one line delay circuit 60 comprises two memory units each with two one-line storage capacity memory areas, and is operated by alternately switching the read and write modes. Thus the 22H image signal is compression processed by line comparison s that only those components of the image signal which differ from the signal in the one preceding horizontal scanning period are output; in addition, the code signal is inserted to the horizontal fly-back period and output from the one line delay circuit 60 at 23H, after which the signal is converted to an analog signal by the D/A convertor 61 and output.

Next at 23H, the output image signal (l 1+l 2+l 3) from the frame memory 55 and the image signal (l 1+l 2) written to the one line memory 57 are compared, and the image signal (l 3) for the difference component is output from the one line delay circuit 60 during 24H. At 24H, the image signal (l 1+l 2+l 3) and the image signal (l 1+l 2 +l 3) in the one line memory 57 are compared, and the signal output from the comparator 56 is thus a null signal from which has been extracted the code signal. Next at 25H, a new image signal (l 4) is supplied to the comparator 56 and the one line memory 57, and in 26H is output from the one line delay circuit 60.

According to this alternative embodiment as thus described, by comparing images by frame and eliminating signal transmission of the coincident components, and further by comparing images by line units within a single frame and eliminating signal transmission of the coincident components, the area in which other information can be inserted and transmitted increases, and the transmission efficiency can be thus even further increased.

Next, an embodiment in which multiple frame memories are used as an alternative to the use of a single frame memory 55 as the output memory is explained hereinbelow with reference to FIG. 14. In this embodiment, the comparator/control circuit 54 shown in FIG. 10 is replaced by a discrete comparator 54a, synchronous separation circuit 54b, and control logic circuit 54c, and the frame memory 55 is replaced by frame memories 55a, 55b, and a selector 55c which selects the output thereof. The operation of this embodiment is described hereinbelow.

The source signal from the signal source 51 is converted to a digital signal by the A/D convertor 52, and supplied sequentially to the frame memory 53 and the comparator 54a in a frame unit. It is also possible for the frame memory 53 to use a CCD. The transmission start point for the signal is frame 1, at which time the frame memory 53 stores zero data. The zero data in the frame memory 53 and the image signal for the first frame are compared by frame unit by the comparator 54a. The output of the comparator 54a is written by frame unit alternately to the frame memory 55a and the frame memory 55b; the read operation is also executed by frame unit. At frame 2, the output of the frame memory 53, i.e., the image signal of the first frame, is compared with the image signal of the second frame, and information indicating the timing at which a difference image component occurs is output to the control logic circuit 54c. The comparison of both signals occurs at 910 sampling points, including the synchronization, in 1H when sampling occurs at 4fsc when the sampling number of the A/D convertor 52 is the reference unit. Timing information indicating the difference in the two signals is identified by the control logic circuit 54c. The control logic circuit 54c comprises a microprocessor, and provides drive control for the frame memories 53, 55a, 55b, comparator 54a, and selector 55c.

Figure 14:
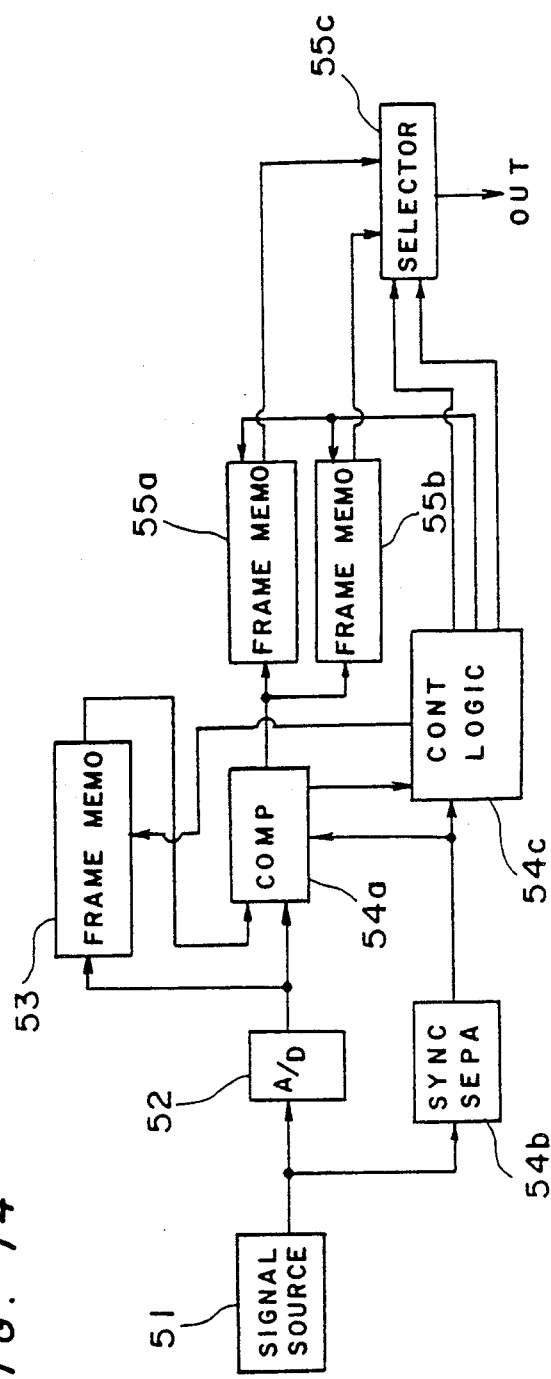
FIGS. 14 and 15 are block diagrams of signal processors for fourth and fifth embodiments, respectively.

In FIG. 14, 54b is the synchronous separation circuit, which detects the vertical and horizontal sync signals from the compound video signal from the signal source. In addition, this synchronous separation circuit 54b comprises a function which multiplies the horizontal sync signal 910 times to generate the 4fsc clock signal. This 4fsc clock signal, horizontal sync signal, and vertical sync signal are input to the control logic circuit 54c, and these signals are used as the clock or gate pulse for drive control of the frame memories 53, 55a, 55b, comparator 54a, and selector 55c. When the code signal as described with respect to the previous embodiments hereinabove is generated by the control logic circuit 54c, the selector 55c is connected to the control logic circuit 54c so that the code signal is inserted to the horizontal fly-back period or the vertical fly-back period.

The operation of this embodiment when the source signal for images which differ slightly by the frame unit as shown in FIG. 11 are signal processed by the signal processor shown in FIG. 14 is described below.

The image signal (a0+b0) for frame 1 is input to the frame memory 53 and the comparator 54a because there is no image signal for the previous frame, and data indicating that the entire image differs from the image in the previous frame is output from the comparator 54a to the control logic circuit 54c. The image signal (a0+b0) after image comparison is completed at the comparator 54a is written to the frame memory 55b.

At frame 2, the image signal (a0+b1) supplied from the signal source 51 is compared with the image signal (a0+b0) stored in the frame memory 53 by the comparator 54a, and data indicating that the image in t2y-t301 differs is output to the control logic circuit 54c. The image signal (a0+b1) for which image comparison is completed is written to the frame memory 55a.

During frame 2 the image signal (a0+b0) in the frame memory 55b is also read out. The read operation is controlled by the control logic circuit 54c, the code signal generated by the control logic circuit 54c is output to the selector 55c during the period t201 (start of line 1) to t209 (end of line 9) in frame 2, and the image signal (a0+b0) read from the frame memory 55b is output from the selector 55c during the following period t210 (beginning of line 10) to t300 (start of frame 3).

Next, at frame 3, the image signal (a0+b2) is compared with the image signal (a0+b1) stored in the frame memory 53 by the comparator 54a, and data indicating that the image component (b) differs is output to the control logic circuit 54c. The image signal (a0+b2) for which image comparison is completed is written to the frame memory 55b.

During frame 3 the image signal component (b1) in the image signal (a0+b1) in the frame memory 55a which differs from the image signal (a0+b0) in the previous frame, i.e., frame 1, is read out. During period t301-t309 in frame 3, the code signal indicating the timing of the image signal component (b1) in frame 2 generated by the control logic circuit 54c and the code signal indicating the timing at which the image signal component (b1) will be sent are sent from the selector 55c, and are sent through the selector 55c from the frame memory 55a at the timing corresponding to the code signal indicating the transmission timing. At this time, the selector 55c is controlled by the control logic circuit 54c so that the output of the frame memory 55a is connected to the selector 55c at the timing corresponding to the code signal indicating the transmission timing.

Thus, he signal processing described hereinabove with respect to the signal processor shown in FIG. 10 can also be achieved by the construction shown in FIG. 14.

Figure 12:
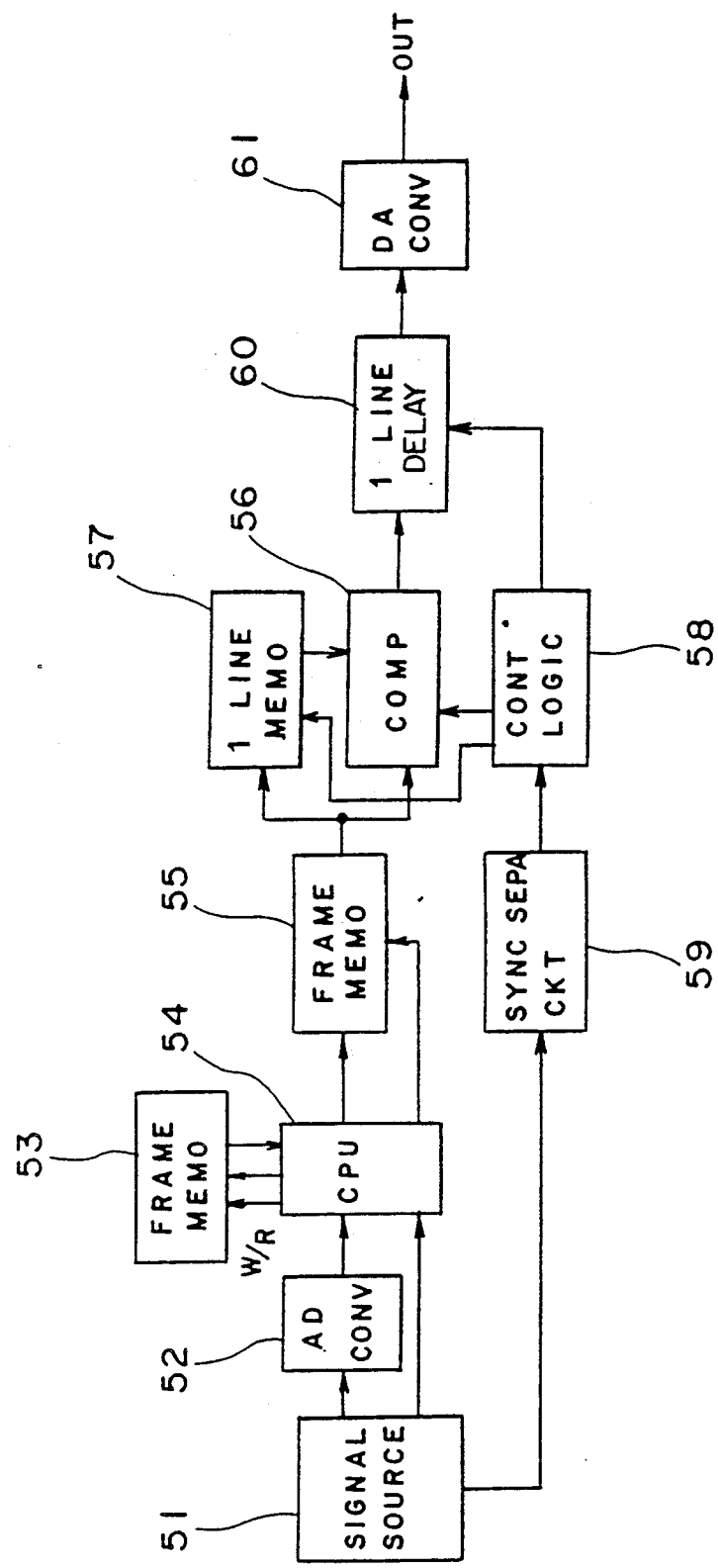
FIG. 12 is a block diagram of a signal processor in an alternative embodiment realized with line comparison in addition to frame comparison.

Next, another embodiment of the signal processing circuit which performs image compression processing based on a line comparison as shown in FIG. 3 is described hereinbelow with reference to FIG. 15 and FIG. 13. Those components in the embodiment shown in FIG. 15 which differ from those in FIG. 12 are the one line memories 60a and 60b and selector 60c, which are provided in place of the one line delay circuit 60.

Figure 15:
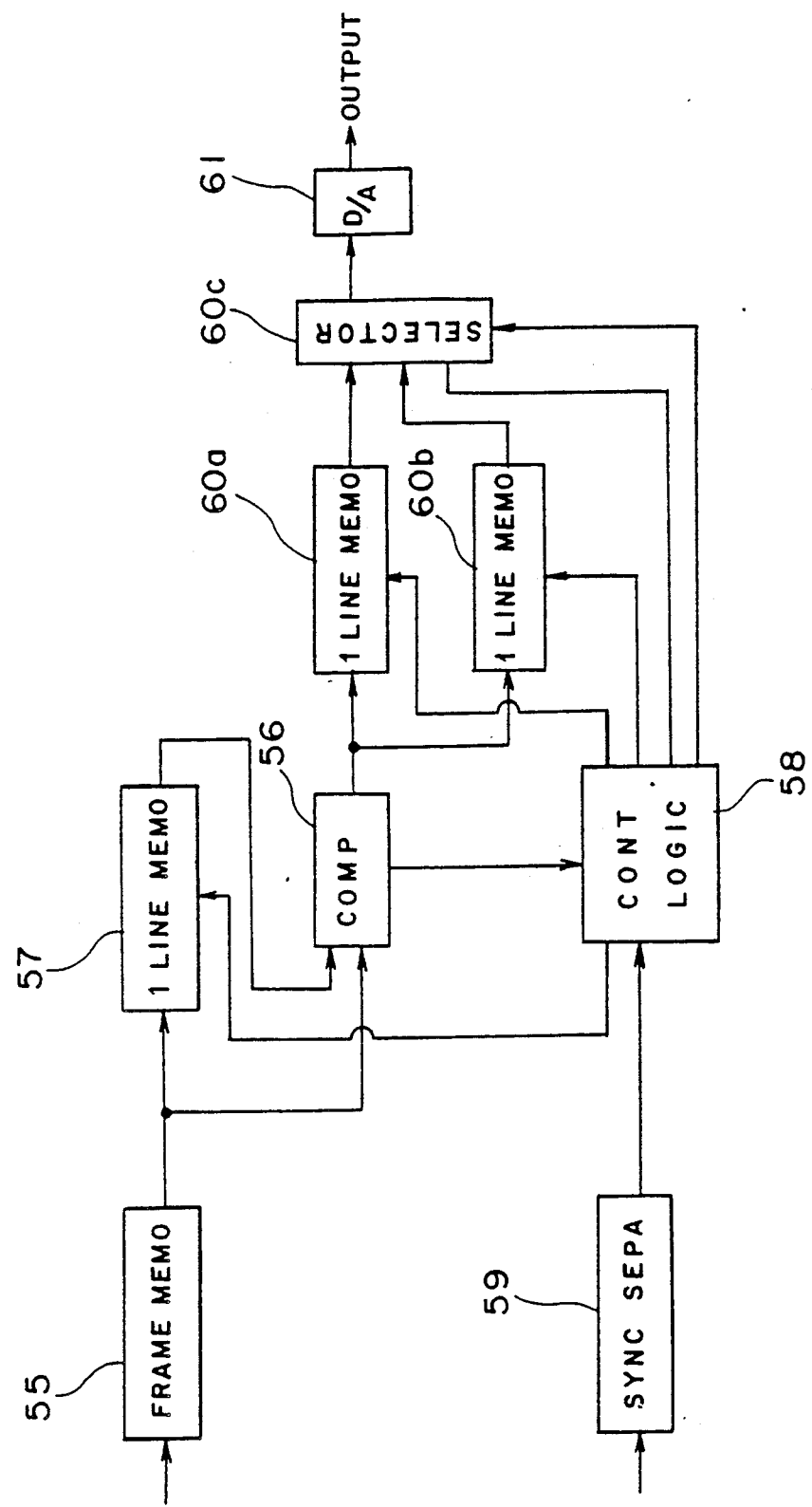

The operation for that case in which an image signal to which image compression has been applied based on a frame comparison is output from the frame memory 55 and input to the device as shown in FIG. 15 as a signal as shown in FIG. 13 is described hereinbelow.

At 21H, the zero data of 20H is written in the one line memory 57. If the image signal (l 1) in 21H as shown in FIG. 13 is input, this image signal (l 1) is input to the comparator 56 and the one line memory 57. The zero data of 20H and the image signal (l 1) of 21H are compared by the comparator 56, and data indicating that the entire signal differs is output to the control logic circuit 58. The image signal (l 1) for which comparison processing is completed is written to one line memory 60a. However, because there was no signal prior to 20H, when the 20H and 21H signals are compared, the entire signal will be different, and the image signal (l 1) in 21H will be output as a full field (1H) signal regardless of the comparison processing of the comparator 56. Therefore, the control logic circuit 58 can be driven to write directly to the one line memory 57 and one line memory 60a without comparison processing through the one frame of 21H.

Next at 22H, the image signal (l 1+l 2) is input, and compared with the image signal (l 1) in the one line memory 57 by the comparator 56, and data indicating the timing at which the image signal component (l 2) which differs in the two signals occurs in 22H is output from the comparator 56 to the control logic circuit 58. The comparison processed image signal (l 1+l 2) is then written to the one line memory 60b.

Also at 22H, the image signal is read from the one line memory 60a. The image signal (l 1) for the 21H in the one line memory 60a is read as the complete image signal because there was no signal present at 20H; at this time, a code signal indicating that the entire 1H signal must be read at t2102-t2103 is sent from the control logic circuit 58 to the selector 60c, and the image signal (l 1) is then sent from the one line memory 60a through the selector 60c.

Next at 23H, the image signal (l 1+l 2+l 3) is input and compared with the image signal (l 1+l 2) in the one line memory 57 by the comparator 56, and data indicating the timing of the image signal (l 3) for the difference component in 23H is output from the comparator 56 to the control logic circuit 58. The image-compared image signal (l 1+l 2+l 3) is then written to the one line memory 60a.

The 22H image signal (l 1+l 2) written to the one line memory 60b is read at the timing set by the control logic circuit 58. In other words, at t2202-t2203 in 23H, the code signal indicating the timing of the image signal component (l 2) which differs in 22H and the code signal indicating the timing at which this signal component (l 2) are sent are output from the control logic circuit 58, and sent out through the selector 60c. Then, only the image signal component (l 2) is output through the selector 60c as the 22H image signal at the timing of t220k-t2201.

Thus, image signal compression based on both comparison methods, line comparison and frame comparison as described with the signal processor shown in FIG. 12, can be achieved. Note that while in this embodiment of the present invention the method of signal processing by frame unit has been described, it is also possible to compress the image signal based on the method as described with respect to the present embodiment when using signal processing by field units, and this embodiment is, of course, also effective for signal processing by field unit.

The following effects are obtained by applying signal processing in which the images are compared by frame or field unit, and only that part of the image which differs is transmitted as the image signal for the frame or field.

(1) It is possible to transmit other information in place of the signal components which are the same, and the transmission efficiency can thus be increased.
(2) Even if the image signal in a transmission is received, the complete image cannot be discerned, and this method is therefore suited to confidential communications.
(3) By varying the transmission timing of the transmission signal irregularly, and encoding the timing information in the transmission, a communication method with high confidentiality can be achieved.
(4) Because this method determines transmission or non-transmission by image data comparison on a simple line or frame basis and does not use an advanced signal compression technique in which a line correlation or frame correlation is detected, the system can be simply constructed.

Next, a receiving device which receives the video signal of a signal processing method in which only the difference component is transmitted by frame or field comparison and restores the original image is described below.

Figure 16:
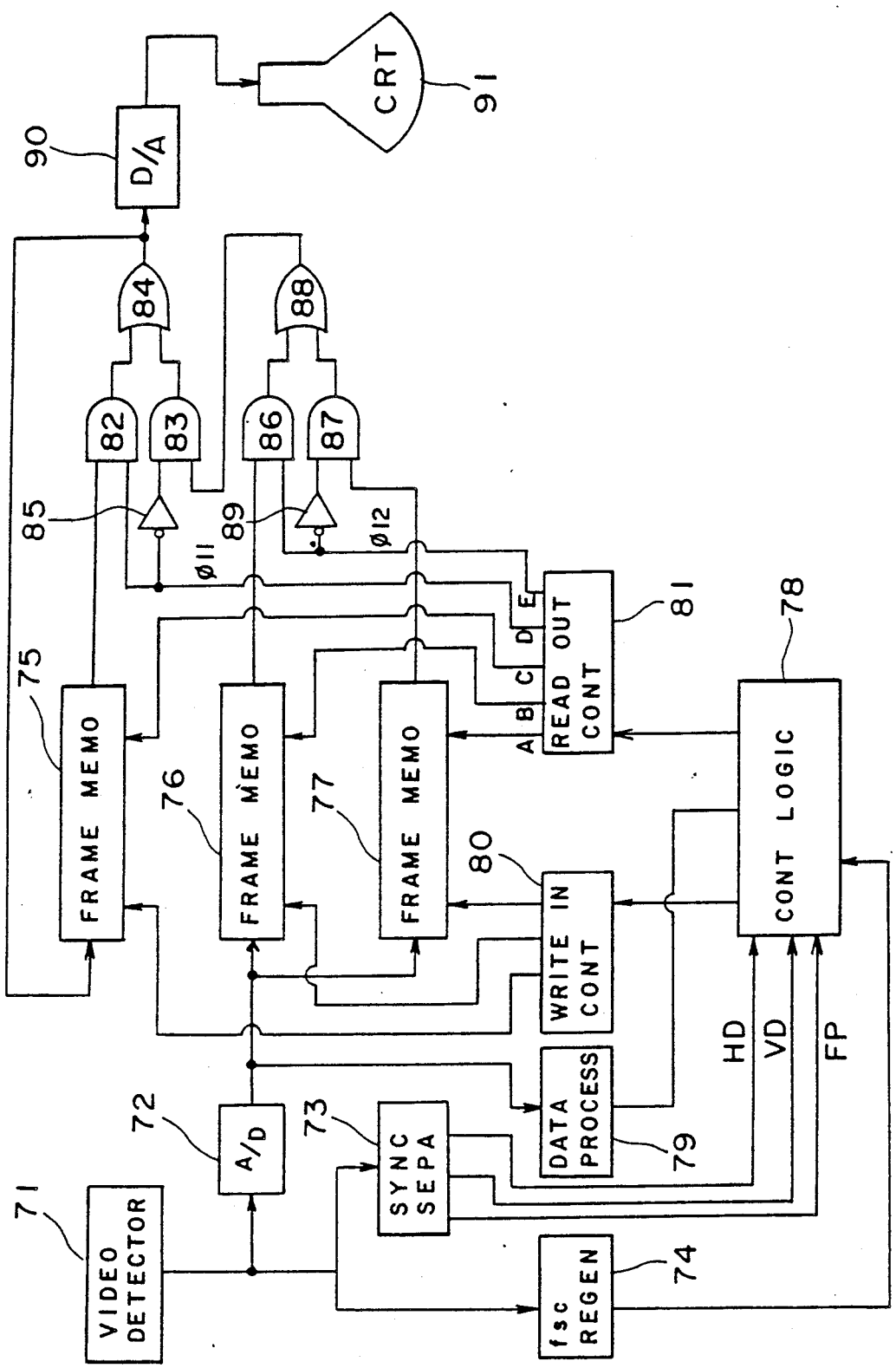
FIG. 16 is a block diagram of the receiver in a television signal processor according to a second embodiment of the present invention.

FIG. 16 is a second embodiment of the television signal receiving device according to the present invention. In FIG. 16, reference number 71 is a video detector circuit which detects a signal in which only the difference component of two input signals compared by frame or field is transmitted, and 72 is an analog/digital (A/D) convertor. The A/D convertor 72 may be, for example, an 8-bit convertor, and output eight lines of parallel data, but in these figures only one line of data is shown. Reference number 73 is a synchronous separation circuit which outputs the horizontal sync signal (drive signal) HD, the vertical sync signal (drive signal) VD, and the frame pulse (FP) (herein this is the same phase a the VD of the field beginning from 1H). Reference number 74 is the chroma subcarrier (fsc) regenerator which is described hereinbelow as an NTSC format signal, though it is not restricted to an NTSC format television signal. The output of the fsc regenerator 74 is input t the control logic circuit 78, and is used for sampling or as a clock. Reference number 75 is a first frame memory with a one frame storage capacity, 76 is a second frame memory, and 77 is a third frame memory 77; 78 is the control logic circuit which controls the drive (writing, reading) of the frame memories 75, 76, 77 by means of the write controller 80 and the read controller 81. Reference number 79 is the data processing circuit which extracts and processes the data signal inserted at t7-t8 and t17-t18 in $\phi$101 in FIG. 3, and extracts the position information of the video image information (t4-t5 and t14-t15 in $\phi$101) included at t1-t2 and t11-t12 in $\phi$101, and outputs this to the control logic circuit 78. Reference numbers 82, 83, 86, and 87 are AND gates, 85 and 89 $\phi$re inverters, 84 and 88 are OR gates, 90 is an image output circuit which comprises a digital-analog (D/A) convertor, and 91 is a cathode ray tube (CRT).

Figure 17:
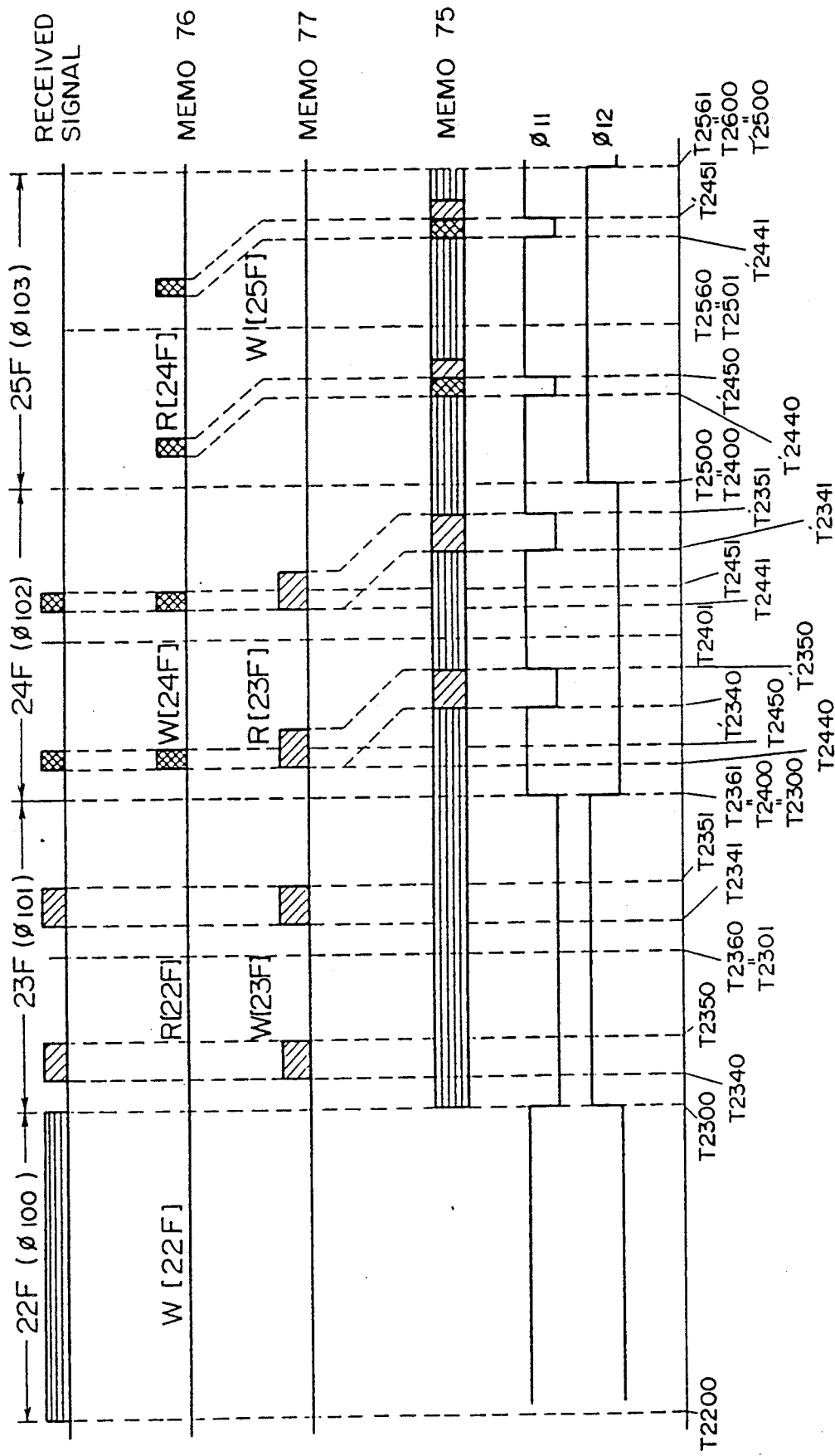
FIGS. 17 and 18 are waveform diagrams to describe the operation thereof.
Figure 18:
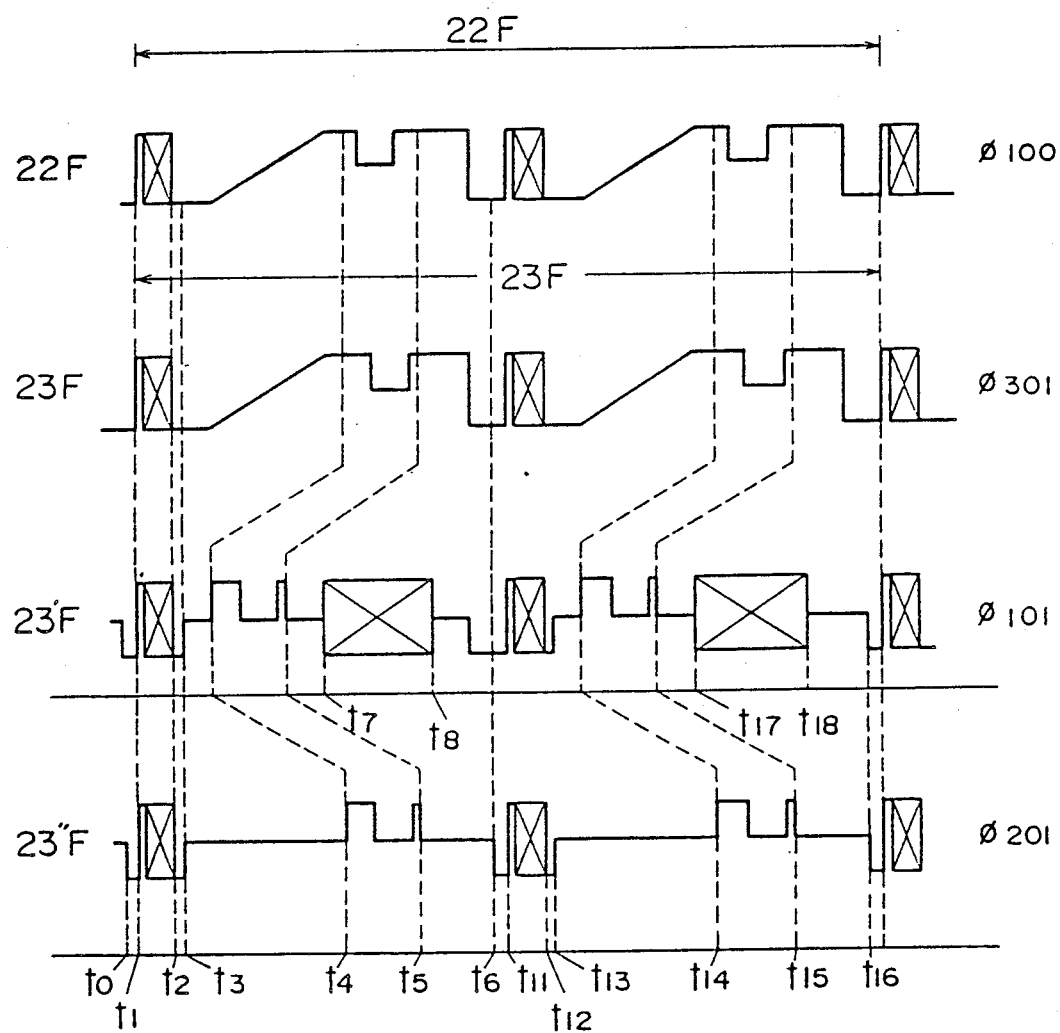

The operation of a television signal receiver as thus comprised is described hereinbelow with reference to FIG. 17 and FIG. 18. FIG. 17 and FIG. 18 are waveform diagrams for the purpose of describing the operation.

When the video signal of 22F is input at the null signal state which is present through frame 21 (hereinafter 21F), the components of the image signal at t3-t6 and t13 –t16 in 22F are completely different from those of the signal at 21F, and the signals at t3–t6 and t13–t16 of φ100 are written to the second frame memory 76. Note that the description herein ignores the horizontal fly-back period with respect to the video signal. In addition, the operation applied to, for example, the signal at periods t3 –t6 in field 1 and the signal at t13–t16 in field 2 is repeated thereafter, and the description hereinbelow is therefore restricted to that applied to the signal in field 1.

Zero data (a black level video signal) is first written to the first frame memory 75 according to the output from the control logic circuit 78 and the code signal indicating that the signals for t3–t6 and t13–t16 in 22F inserted in 1H or two or more horizontal scanning periods must be written to t1–t2 and t11–t12 in φ101, i.e., to the vertical fly-back period, is extracted by the data processing circuit 79 and sent to the control logic circuit 78 in parallel with the writing of the video signal to the second frame memory 76. Specifically, the control logic circuit 78 is drive controlled according to this extracted code signal, and the input signal of 22F is write controlled so that the signals at t3–t6 and t13–t16 are written to the second frame memory 76. This write operation is indicated with a RWS (22F) in FIG. 17.

At 22F, simultaneous to the writing of the 22F received signal to the second frame memory 76, the video signal for 21F, i.e., the previous frame, is output from the first frame memory 75 according to the control of the control logic circuit 78. More specifically, a control signal is input from the control logic circuit 78 to the read controller 81 to cause the read controller 81 to output a read clock; this read clock enables reading from the first frame memory 75, causes the AND gate 82 to open with a high level signal from the D terminal of the read controller 81, thus setting the output of the inverter 85 to a low level, and closing the AND gate 83.

Thus, the black level video signal read from the first frame memory 75 at 22F passes AND gate 82 and OR gate 84, is converted to an analog signal by the D/A convertor circuit 90, and the processed video signal is displayed on the CRT 91. This 22F signal (the 21F video signal) is also passed from the output of the OR gate 84 through the feedback loop connected to the input of the first frame memory 75 and is rewritten to the first frame memory 75. Therefore, with the supply of the read clock to the first frame memory 75, the write clock is supplied according to the control of the control logic circuit 78 from the write controller 80 from 22H to 262.5H and from 284H to 525H corresponding to t3–t6 and t13–t16 in 22F. Note that there is actually a phase difference in the read clock to the second frame memory 76 and the write clock to the first frame memory 75, but this phase difference is herein ignored in this description. The method whereby a phase difference is provided for data transfer from memory to memory is one of common knowledge, and further description is therefore omitted.

Next in 23F, the signal φ101 comprised of the video signal for the difference component in the result of the comparison of the 23F signal on the transmitter side (φ301 in FIG. 18) and the 22F signal (φ100 in FIG. 18) is input to the third frame memory 77 via the video detector circuit 71 and the A/D convertor 72. As with the case of 22F described hereinabove, a code signal is inserted to t1 –t2 and t11–t12 in the 23F signal, and writing of the 23F input signal φ101 to the third frame memory 77 is executed according to this code signal.

The signal φ101 differs from the signal φ100 in the previous frame at t4–t5 and t14–t15, but the signal is controlled here so that all components from t3–t6 and t13–t16 are written to the third frame memory 77. Note, however, that selective writing of the differing periods t4–t5 and t14–t15 can be easily achieved with this embodiment, and no problems would be caused by so defining the code signal.

With the writing of the reception signal t the third frame memory 77 in 23F, the data in the second frame memory 76 is output to the first frame memory 75 and displayed based on the 22F code signal stored in the memory (not shown in the figure) of the control logic circuit 78.

Specifically, the AND gate 82 is closed by the low level signal from the read controller 81, thus causing the inverter 85 to output a high level signal which opens AND gate 83. Moreover, the high level signal from the E terminal of the read controller 81 causes the AND gate 86 to open, and the low level signal output from the inverter 89 causes the AND gate 87 to close. With the gates thus set, a read clock is supplied from the read controller 81 to the second frame memory 76 so that the signals for t3–t6 and t13–t16 in φ101 are read. Thus, the φ100 video signal in the second frame memory 76 passes the AND gate 86, OR gate 88, inverter 85, AND gate 83, and OR gate 84, is signal processed by the D/A convertor circuit 90, and displayed on the CRT 91. In addition, the video signal for t3–t6 and t13 t16 in φ100 is written through the feedback loop on the OR gate 84 output side to the first frame memory 75 from T2300–T2400 in FIG. 17 (corresponding to period t3–t16 in FIG. 18 with the omission of t6–t13). A write clock is, of course, supplied to the first frame memory 75 at this time.

Note that time T2300 in FIG. 17 corresponds to the t0 in 23F in FIG. 18, but that t0–t3 are omitted from the figure in FIG. 17. It is to be noted that this has absolutely no affect on the operation of the present invention, and does not degrade the essential quality of the present invention.

Next at 24F, the signal φ102 (FIG. 17 reception signal T2400–T2500) comprising the video signal for the difference component based on the comparison result of the 24F signal on the transmitter side (not shown in FIG. 18, stored in the first frame memory 75 in FIG. 17 (T2500–T2600)) and the 23F signal (φ301 in FIG. 18, stored in the first frame memory 75 in FIG. 17 (T2400–T5500)) is input to the second frame memory 76. Storage to the second frame memory 76 is controlled according to the code signal as described above with respect to 22F and 23F so that the signal corresponding to the periods t3–t6 and t13–t16 in signals φ100, φ101, and φ301 is written to the second frame memory 76.

With the writing of the received signal φ102 to the second frame memory 76, transfer of the signal in the third frame memory 77 to the first frame memory 75, and switching between the first frame memory 75 and the third frame memory 77 for reading and display are also executed based on the 23F code signal stored in the memory of the control logic circuit 78.

Specifically, in order to restore the original image in 23F, the signal is first read from the first frame memory 75 during periods T'2300 (T2400)–T'2340, and the signals must then be read from the third frame memory 77 during the period T'2340–T'2350, and again from the third frame memory 77 during period T'2341–T'2351, and from the first frame memory 75 during period T'2351 T2500 (T'2400).

In order to achieve this reading control, a high level signal Φ11 is output from terminal D of the read controller 81 during periods T'2300 T'2340, T'2350 T'2341, T'2351-T'2400, and a low level signal Φ11 is output during periods T'2340-T'2350, T'2341-T'2351, and a low level signal Φ12 is output from terminal E.

Thus, during periods T'2300-T'2340, T'2350-T'2351-T'2400 the AND gates 82 and 87 are open and the AND gates 83 and 86 are closed; during these periods the output signal from the first frame memory 75 to which the read clock is supplied passes gates 82, 84, the D/A convertor circuit 90, and is displayed on the CRT 91.

During the other periods T'2340-T'2350, T'2341-T'2351, AND gates 83 and 87 are open and AND gates 82 and 86 are closed; during these periods the output signal from the third frame memory 77 to which the read clock is supplied passes gates 82, 84, the D/A convertor circuit 90, and is displayed on the CRT 91.

In this way the original image Φ301 of 23F is reproduced and displayed on the CRT 91. Note that the write clock is supplied to the first frame memory 75 so that a so-called read-modified-write occurs; the difference component is rewritten so that the signal Φ301 is formed in the first frame memory 75. This signal stored in the first frame memory 75 becomes as shown during T2400-T2500 in FIG. 17.

At 25F, the signal Φ103 (reception signal T2500-T2600) comprised of the difference component based on the comparison result of the 25F source signal on the transmitter side and the 24F signal ((T2500-T2600) in the first frame memory 75 in FIG. 17) is input to the third frame memory 77.

With the writing of the reception signal Φ103 to the third frame memory 77, transfer of the signal in the second frame memory 76 to the first frame memory 75, and switching between the first frame memory 75 and the second frame memory 76 for reading and display are also executed based on the 24F code signal stored in the memory of the control logic circuit 78.

Specifically, in order to restore the original image in 24F, it is necessary to first read the signal from the first frame memory 75 during periods T'2400 (T2500)-T'2440, T'2450-T'2441, and T'2451-T'2500 (T2600), and from the second frame memory 76 during the periods T'2440-T'2450 and T'2441-T'2451. In order to achieve this reading control, a high level signal Φ11 is output from terminal D of the read controller 81 during periods T'2400-T'2440, T'2450-T'2441, T'2451-T'2500, and a low level signal Φ11 is output during periods T'2440-T'2450, T'2441-T'2451, and a high level signal Φ12 is output from terminal E.

Thus as the result of this reading control, during periods T'2400-T'2440, T'2450-T'2441, T'2451-T'2500 the AND gates 82 and 86 are open and the AND gates 83 and 87 are closed, and the read output signal from the first frame memory 75 is displayed on the CRT 91; during the other periods T'2440-T'2450, T'2441-T'2451, AND gates 83 and 86 are open and AND gates 82 and 87 are closed, and the read output signal from the second frame memory 76 is displayed on the CRT 91. In this way the original image of 24F is reproduced and displayed on the CRT 91. Note that the read-modified-write applied to the first frame memory 75 at this time is executed as it is during the 24F.

Thereafter, writing occurs alternately to the second frame memory 76 and the third frame memory 77 depending on whether the frame is an odd-numbered frame or an even-numbered frame, reading occurs from the first frame memory 75 and either the second frame memory 76 or the third frame memory 77, the source signal for the one frame preceding the frame of the currently received signal is always reproduced in the first frame memory 75, or is written in its entirety as received, so that the images of one (frame) screen are sequentially reproduced.

According to the present embodiment as described hereinabove, it is possible to restore and reproduce a compression processed signal using only three frame memories, thereby making it possible to reduce the cost of the equipment and achieve a more compact reception system.

One example of the code signal as referred to in the above description is described below with reference t FIG. 19.

Figure 19:
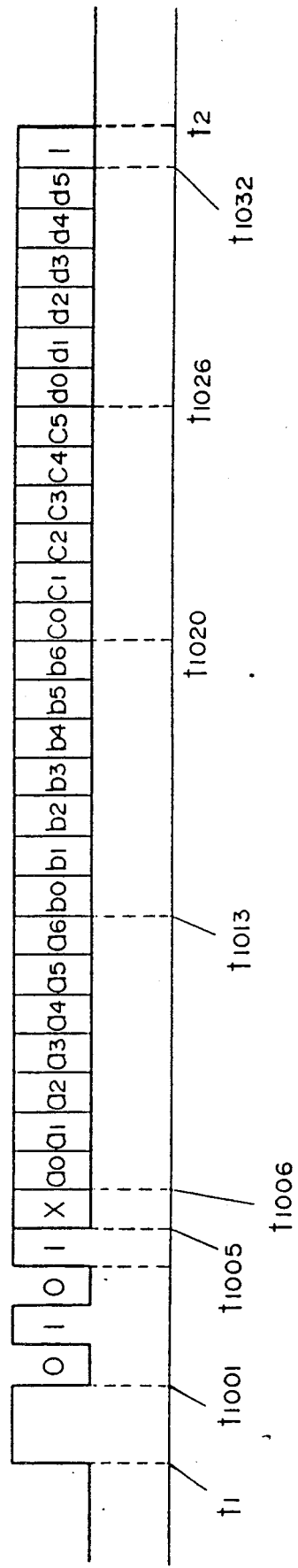
FIG. 19 is a waveform diagram showing a sample code signal used in the embodiment shown in FIG. 16.

In FIG. 19 t1-t1001 is the vertical sync signal, t1001-t2 is 1H (or 0.5H) in the vertical blanking period, and may be, for example, the 1H (or 0.5H) following the vertical sync signal. If the period t1001-t2 is 0.5H (=63.5 μs/2), and a 32-bit signal is therein inserted, 1 bit is equal to approximately 1 μs, thus making electrical signal processing quite simple. Note that in FIG. 18 and FIG. 19 the length of t1-t2, and therefore the length t1-t1001 and t1001-t2, do not match in the figures; this is a problem of graphic representation in the figures, and the operation is not affected whether t1-t1001 is 1H or 3H, or t1001-t2 is several H periods.

In the code signal shown in FIG. 19, t1001-t1005 consists of the start mark R0101,S t1032-t2 is the stop bit; the x-bit at t1005-t1006 is the code indicating whether the present frame signal is a partial signal as shown in 23F and 24F in FIG. 17, or is a complete signal as shown at 22F and 25F, and may be set, for example, as x=0 for a partial signal or x=1 for a complete signal. Note that code signals with the same construction and meaning are inserted at t1-t2 and t11-t12 in one frame. Note that it is also possible to omit insertion of the code signal at t11-t12. Furthermore, if the start mark at t1001-t1005 is changed for every field, field detection will also be facilitated.

The seven bits at a0-a6 identify the length from t1-t4 in signal Φ201 in FIG. 18, and the corresponding seven bits in the second field express the length from t11-t14 in signal Φ201. The seven bits b0-b6 express the length from t1-t5 or from t11-t15 in signal Φ201 and Φ301, and c0-c5 express the length of t1-t4 or t11-t14 in Φ101. The final six bits from d0-d5 express the length from t1-t7 or from t11-t17. Because there are seven bits from a0 a6, one field can be expressed as 128 components, and the timing of t7 can be obtained every 2H. In the video signal for one field (262.5H), because t1-t3 normally occupy approximately 21H, the timing of the signal can be expressed by approximately 242H if the field is divided from 22H. If 2H are represented by one bit, seven bits can sufficiently express the timing. It is sufficient to define the length every 4H for the 6-bit data at c0-c5 and d0-d5.

Figure 20:
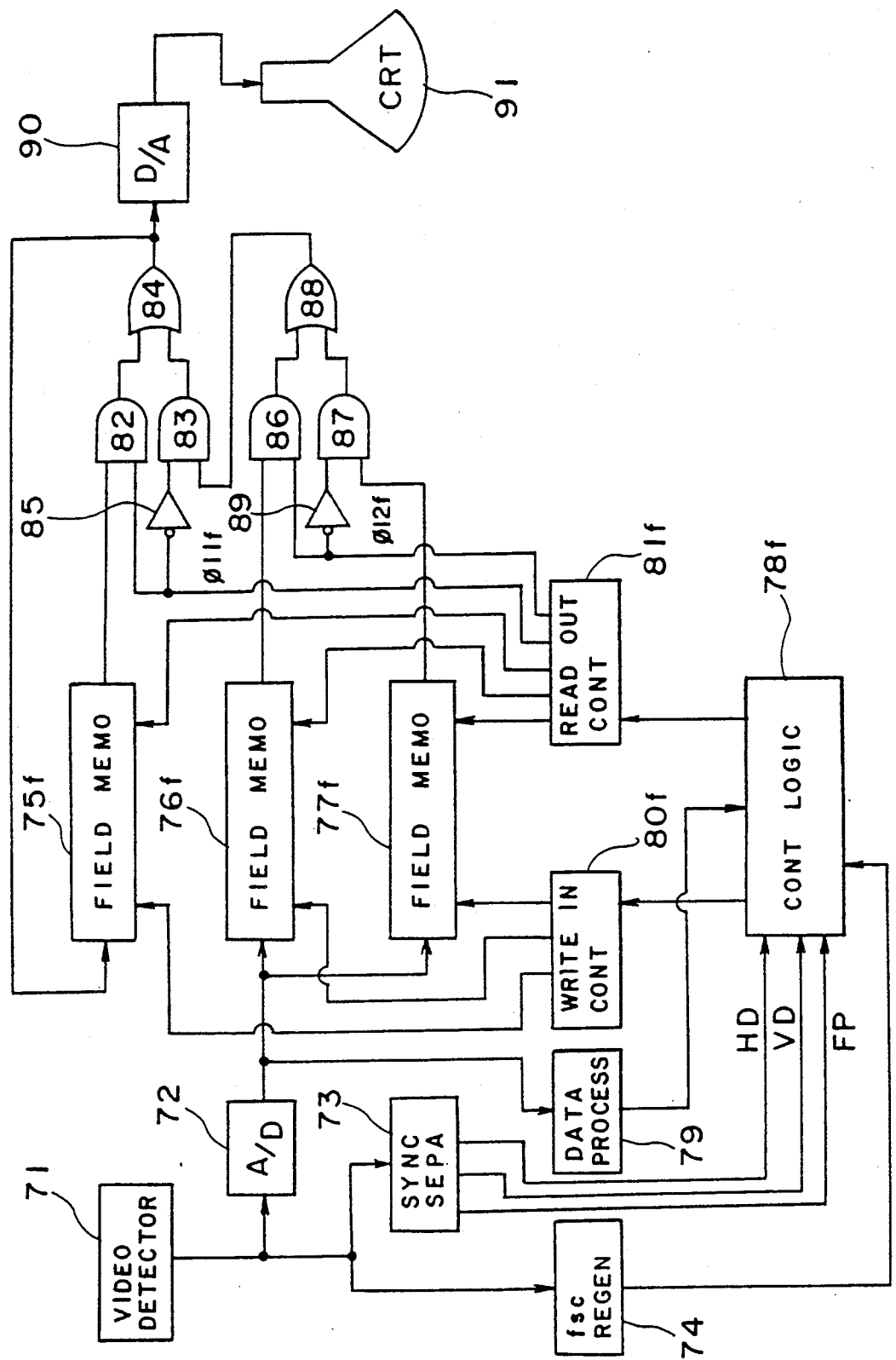
FIG. 20 is a block diagram of the television signal receiving processor in a third embodiment according to the present invention.
Figure 21:
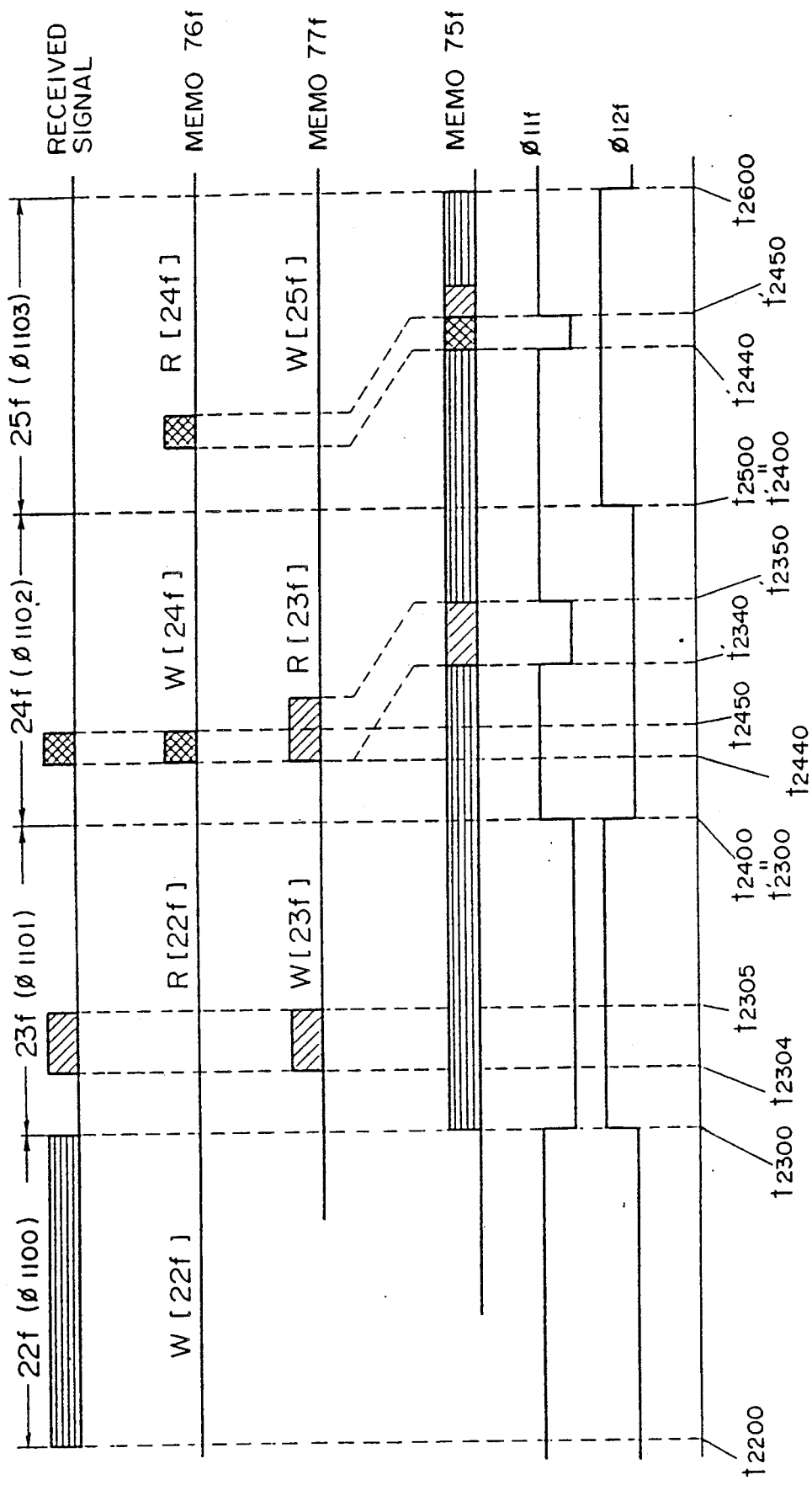
FIGS. 21 and 22 are waveform diagrams to describe the operation thereof.
Figure 22:
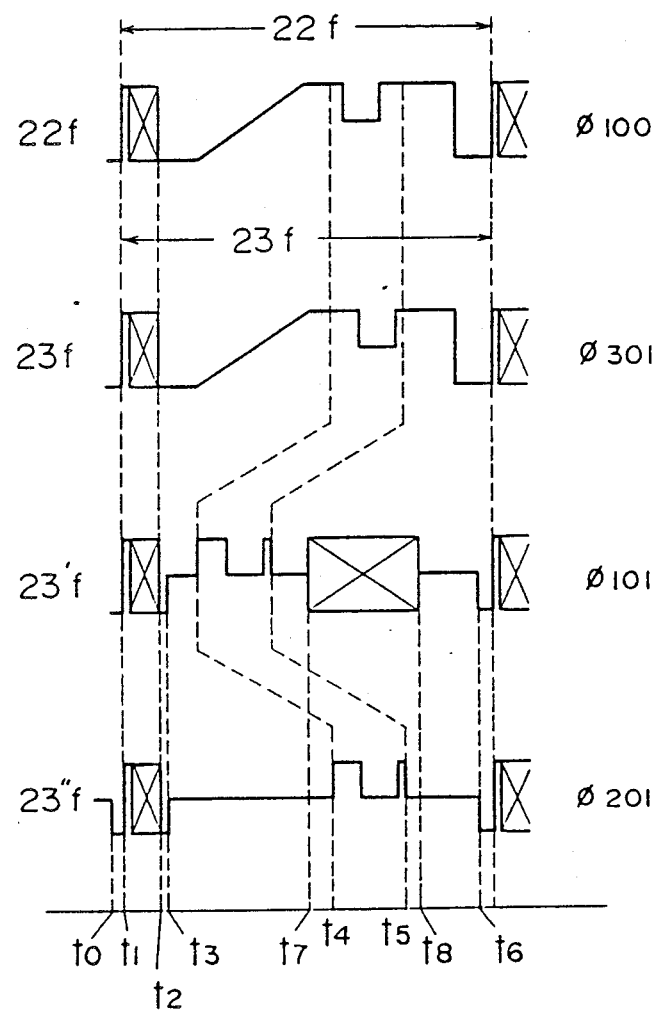

A preferred embodiment of a television signal receiver according to the present invention which is suited to the signal processing method whereby video signals are compared on the basis of two consecutive fields and the video signal for a given field is a signal for only that part of the signal which differs is described hereinbelow with reference to FIGS. 20 to 22. FIG. 20 is a block diagram of a television signal receiver according to the present invention, and FIG. 21 and FIG. 22 are waveform diagrams used to explain the operation of said receiver. These correspond to FIGS. 16-18 for the second embodiment described hereinabove.

As will be known from the block diagram of this third embodiment of the present invention as shown in FIG. 20, it differs in that the frame memories 75, 76, and 77 are replaced by field memories 75f, 76f, and 77f. Because the screen image comprises one frame of two fields, the video signal which can be omitted is reduced even with still images when compared with the frame method as described with reference to the embodiment hereinabove, but there is no change in the fact that there is a significant reduction in the amount of transmission data for the original image itself.

The operation of the third embodiment of the television signal receiver as shown in FIG. 20 corresponds to the description of the first field in the description of frame unit operation in the previous embodiment, and there is no fundamental change in operation in any way. Further detailed description of its operation is therefore omitted.

In the second and third embodiment as a thus described, if the partial signal (t4-t5 in the signal $\phi$301 in FIG. 22) is transmitted and received in the same frame or field at a position (t4-t5 in signal $\phi$101 in FIG. 22) different from the original image, and the code signal is pre-encoded so that only specific contract parties can decode the code signal, discrete transmission of video and data is possible. Furthermore, if the position of the partial signal is periodically varied, confidential communications which cannot by read by third parties can also be easily achieved.

Note while that in the second and third embodiments the descriptions above assumed that the partial signal was positioned at one place in one frame or one field, by slightly increasing the number of bits in the code signal, partial signals may be easily placed at two or more positions with the same basic operation. For example, because in text broadcast 190-bit information is sent in 1H, it is possible to insert seven sets in the 26 bits from t1006-t1032 in FIG. 19, thus enabling correspondence with partial signals at seven locations.

Next, a fourth embodiment of the television signal receiver according to the present invention is described hereinbelow with reference to the accompanying figures. The major feature of this embodiment is that instead of using three frame memories or field memories, only one frame memory or field memory and two line memories are used to restore the signal transmitted with the difference components obtained from a frame or field comparison to the source image. This embodiment is described with the frame memories 76, 77 shown in FIG. 16 replaced with line memories 76L, 77L.

Figure 23:
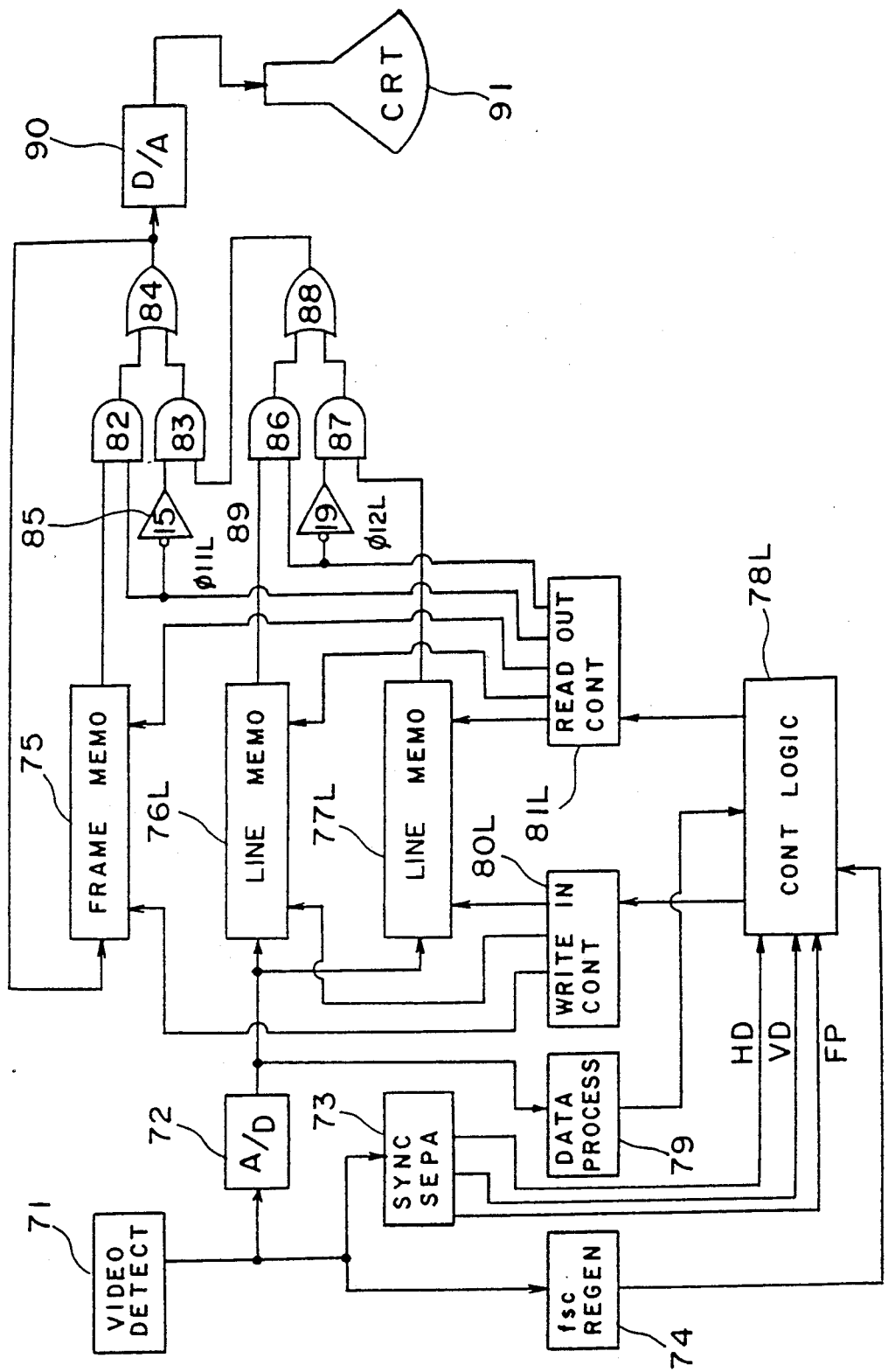
FIG. 23 is a block diagram of the television signal receiving processor in a fourth embodiment according to the present invention.

In FIG. 23, those components which differ from the embodiment shown in FIG. 16 include line memories 76L, 77L as described above, control logic circuit 78L, write controller 80L, and read controller 81L, which differ slightly in that the control of these is based on a line unit, and all other components are the same, with like parts identified by like reference numbers. Specifically, the input television signal is detected by the video detector circuit 71, A/D converted, and input alternately to the line memories 76L, 77L according to the code signal inserted, for example, to t1-t2, at the header position of each horizontal scanning period. The code signal is, as described above, extracted by the data processing circuit 79, processed, and input to the control logic circuit 78L, which thus controls the write controller 80L, read controller 81L, and opens and closes gates 82-89 according to the code signal.

Figure 24:
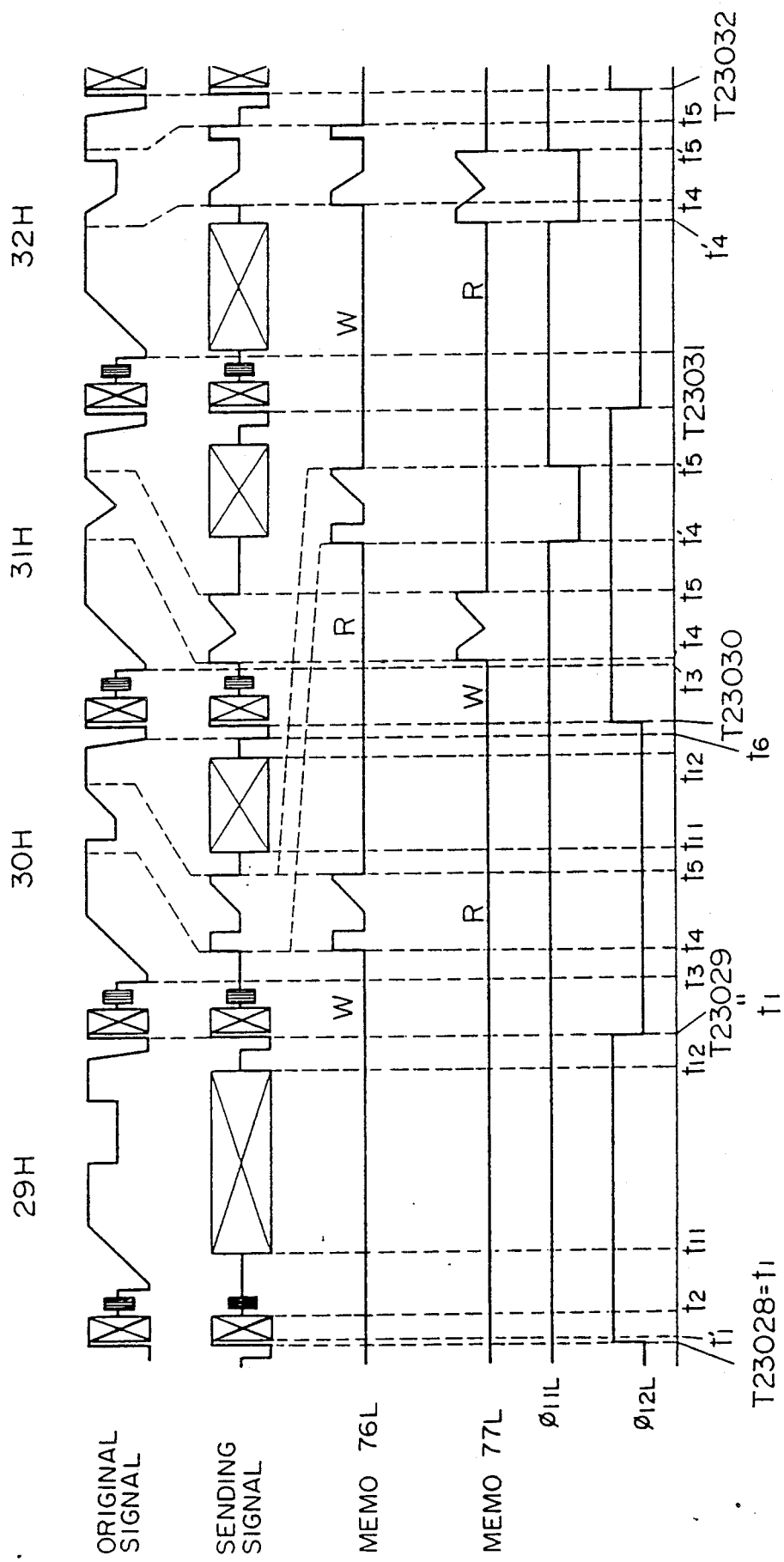
FIGS. 24 and 25 are waveform diagrams to describe the operation thereof.
Figure 25:
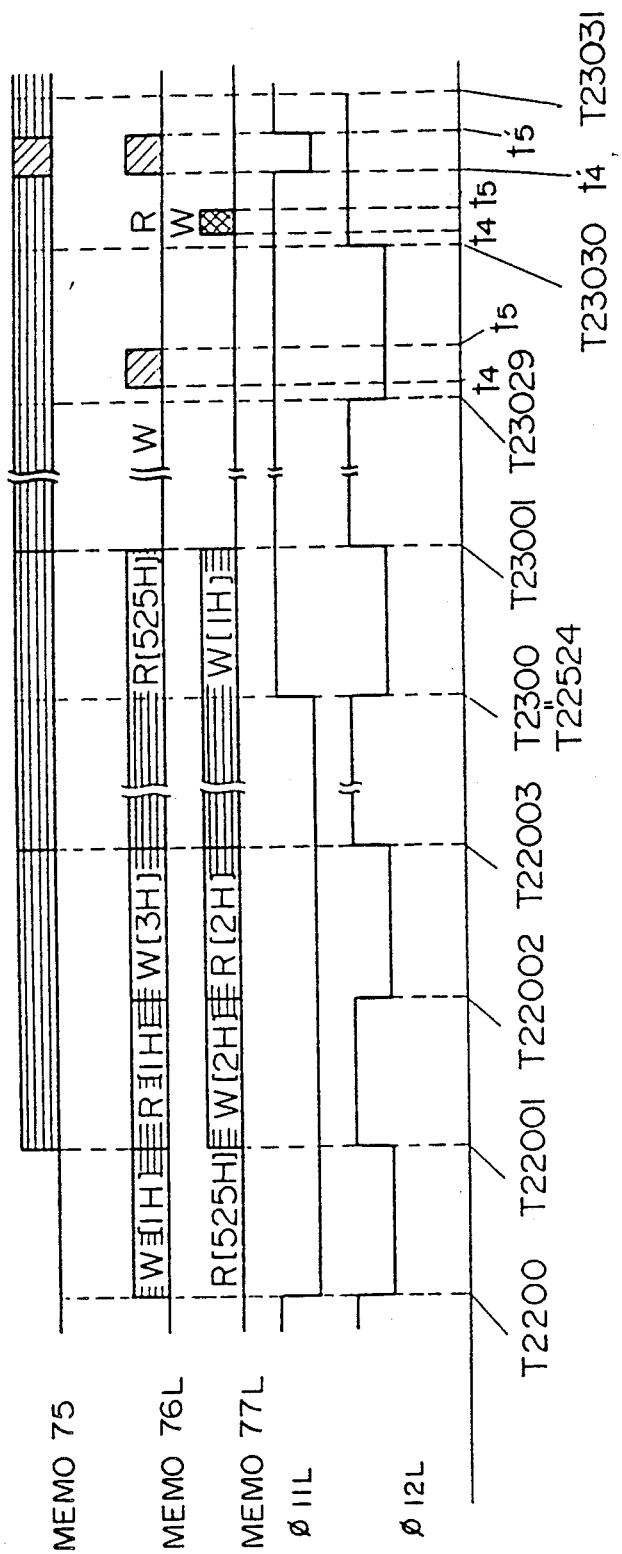

The operation of the receiver according to this embodiment as it processes a signal corresponding to that at period T2200-T2400 in FIG. 17 as described hereinabove is described below with reference to FIG. 25 and FIG. 24.

As described with the case of the second embodiment above, the signal at the period T2200-T2300 is controlled and processed so that the complete signal is written to the first frame memory 75 because there was no signal present at 21F. In other words, with respect to T2200-T2300 in FIG. 25, writing and reading are controlled so that the signal written to one line memory at a given horizontal scanning period (nH) is read at the next horizontal scanning period ((n+1)H), and the signal read from the line memories 76L and 77L passes the AND gates 86, 87, OR gate 88, AND gate 83, and then OR gate 84, wherefrom the signal is output to the D/A convertor circuit 90, and then fed back for the read-modify-write operation to the frame memory 75. Therefore, the output signal $\Phi$11L at terminal D of the read controller 81L is a low level signal during T2200-T2300, and the output signal at terminal E changes between a low and high level signal at each 1H. Therefore, the read clock from the read controller 81L to the line memories 76L, 77L is also alternately supplied every 1H.

The description hereinbelow refers to that case in which a signal to be rewritten from 30H in frame 23 is received.

The video signal (t4-t5) at 30H (T23029-T23030) is written to the line memory 76L, the video signal for 29H in the preceding frame 22F is read from the first frame memory 75, passes the AND gate 82, OR gate 84, and this 30H is output to the CRT 91.

At the next horizontal scanning period 31H, the t4-t5 signal (the crosshatched area at line memory 77L in FIG. 25) for the difference component at T23030-T23031 in the received signal for 31H is written to the line memory 77L according to the code signal. Also, following the reading of the video signal for 30H in 22F from the frame memory 75 from t0-t'4, the signal written to the line memory 76L at 30H is read at t'4-t'5 in period T23030-T23031, passes the AND gate 86, OR gate 88, AND gate 83, and the OR gate 84, and is then output from the D/A convertor circuit 90 for display to the CRT 91, and the read-modify-write operation is applied to the frame memory 75.

Next at 32H, the signal received at 32H is written to the line memory 76L according to the code signal at t4-t5 in T23031-T23032. Also, the 31H video signal in 22F is read from the first frame memory 75 at t0-t'4, followed by the signal (the crosshatched area) written to line memory 77L in 31H being reread from t'4-t'5. In other words, at t0-t'4 and t'5-T23032, AND gates 82, 87 are open, AND gates 83, 86 are closed, the contents of the first frame memory 75 are read, and at t'4-t'5, AND gates 83, 87 are open, AND gates 82, 86 are closed, and the contents of the line memory 77L are read. Thus, the signal read from AND gates 82, 83 passes the OR gate 84, the D/A convertor circuit 90, and is displayed on the CRT 91, or is fed back to the first frame memory 75 where a read-modify-write is performed. By repeating this signal processing, the video compression applied on the transmission side can be restored to the original signal without error on the receiving side. According to the processing method in this embodiment, it is sufficient to send in horizontal scanning line units only that part of the frame contents which differ, and because those parts of the horizontal scanning lines which are the same can also be omitted, the amount of information in the video signal which must be transmitted can be reduced. Furthermore, the transmission efficiency ca be increased because another data signal can be inserted in those open areas of the signal not carrying video signal data. In addition, this method can also be used for confidential communications by comprising the code signal so that it can only be received by specific contract parties.

Figure 26:
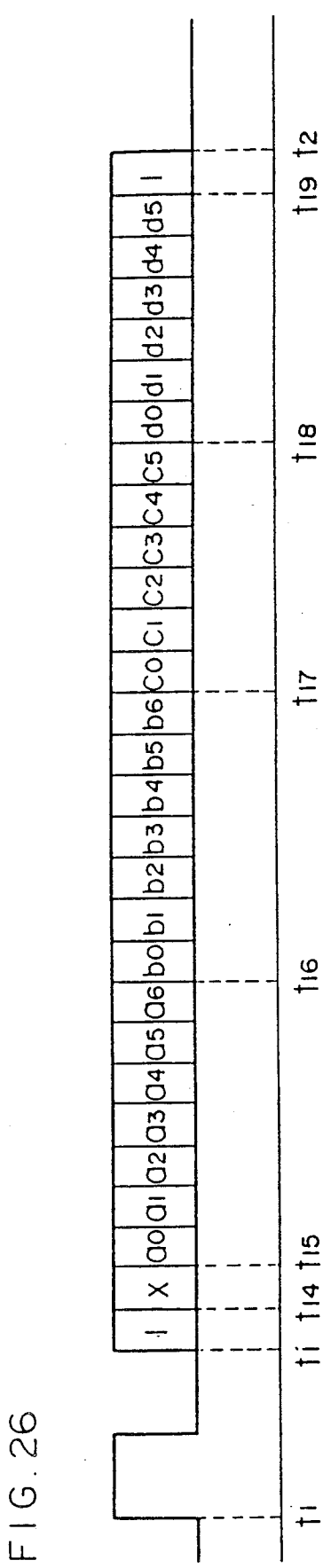
FIG. 26 is a waveform diagram showing a sample code signal as used in the fourth embodiment according to the present invention.

One example of the code signal inserted at each horizontal scanning line unit in this fourth embodiment i described hereinbelow. In FIG. 26, t1 t'1 is the horizontal sync pulse, t'1–t14 is the start bit, and the x-bit at t14–t15 indicates whether the signal for that horizontal line is a partial signal or a complete signal extending across the full band of 1H, and may, for example, contain a R0S to indicate a partial signal and a R1S for a complete signal.

The seven bits at a0–a6 (t15–t16) are the code identifying, for example, the length from t1–t'4 when t4 in 30H is t'4 in the source image signal; the seven bits b0–b6 (t16–t17) are the code identifying, for example, the length from t1–t'5 when t5 in 30H is t'5 in the source image signal. The six bits c0–c5 (t17–t18) express the length of t1–t4 in 30H, and the six bits from d0–d5 (t18–t19) express the length from t1–t1. If the signal is a standard NTSC format signal, 1H is approximately 63.56 $\mu$s, and there are therefore 910 sampling points when the signal is sampled at 4fsc based on the output of the fsc regenerator 74. Therefore, if there are ten bits, the length from t4–t5 can be determined at each sampling interval, but when the signal is transmitted including components in which there is no difference, the lowest three bits (8 samples at 4fsc: approx. 560 nsec.) can be dropped with no problems posed for practical use. Therefore, the lowest three bits in a0–a6 and b0–b6 may be dropped and the code comprised to express the timing for 8 sampling units. By dropping the lowest four bits for c0 –c5 and d0–c5, the code can be comprised to express the timing at each 16 samples in 4fsc, i.e., approx. 1.12 $\mu$sec. increments. In FIG. 26, t19–t2 is the stop bit, and t'1 –t2 is thus a 33-bit code including 29 bits and a 4-bit horizontal sync pulse. If 1 bit is $\frac{1}{2}$ fsc, approx. 139.7 nsec., 33 bits is 4.61 $\mu$sec., sufficient to fit the horizontal sync signal width in the NTSC format, and the code signal can thus be inserted without affecting the color burst. By applying specific encoding to this signal and transmitting the decoding information only to specific contract parties, confidential communications can be achieved. This decoding information may be inserted at various areas, including, for example, the vertical fly-back period.

Figure 27:
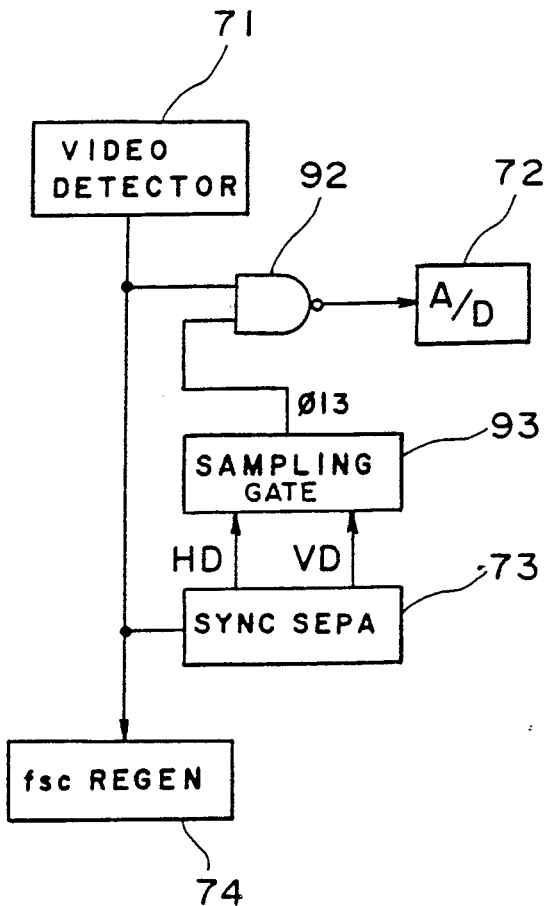
FIG. 27 is a block diagram showing a one example of a television signal receiving processor suitable to confidential communications.
Figure 28:
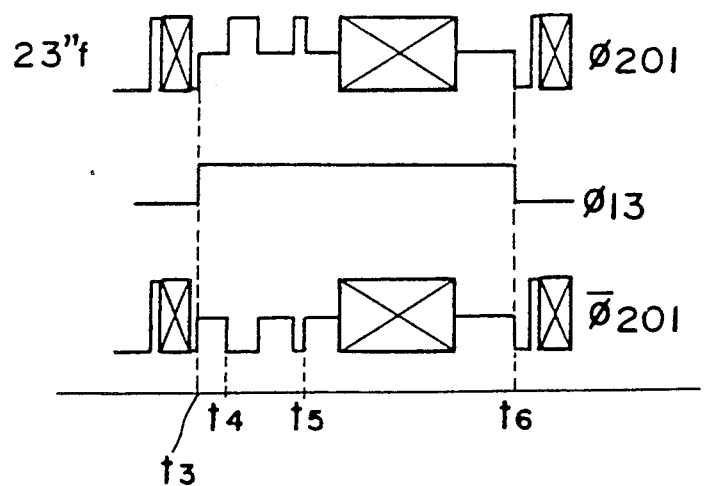
FIG. 28 is a waveform diagram to describe the operation of the device shown in FIG. 27.

Next, one example which may be used for confidential communications with discrete transmission is described with reference to FIG. 27 and FIG. 28. Confirmation of the transmitted image contents is made easier when the video component with differences between frames or fields as described in the second through fourth embodiments hereinabove increases. Thus, one possible method is to invert the video and data components (t3–t6) in signal $\phi$201 at the transmitter as shown by signal $\Phi$201 in FIG. 28. Therefore, to reproduce a video signal thus inverted, as shown in FIG. 27, the output of the video detector circuit 71 is input to the A/D convertor 72 through an analog NAND gate 92 which is provided therebefore; to the other input to the NAND gate 92 is input the gate signal $\Phi$13 from the sampling gate generator 93, thus inverting t3–t6. The drive signals VD and HD from the synchronous separation circuit 73 are input to the 25 sampling gate generator 93 to generate the gate signal $\Phi$13. Thus, the signal inversion circuit is a device of common knowledge, and further detailed description is therefore herein omitted. This inversion function can likewise be applied to all of the embodiments two through four hereinabove, and can thus be used to achieve a high confidentiality communications function.

According to the present invention, images are compared by line, frame, or field, and the image signal is processed for transmission of the difference component only of the line, frame, or field, thereby yielding the following effects.

(1) It is possible to transmit other information in place of the signal components which are the same, and the transmission efficiency can thus be increased.

(2) Even if the image signal in a transmission is received, the complete image cannot be discerned, and this method is therefore suited to confidential communications (3) By varying the transmission timing of the transmission signal irregularly, and encoding the timing information in the transmission, a communication method with high confidentiality can be achieved.

(4) Because this method determines transmission or non-transmission by image data comparison on a simple line or frame basis and does not use an advanced signal compression technique in which a line correlation or frame correlation is detected, the system can be simply constructed.

What is claimed is:

1. A signal processor comprising:

a transmitter including means for dividing a television signal into horizontal scanning line units, means for comparing a video signal Vn of an nth horizontal scanning period with a video signal Vn−1 of an (n−1)th horizontal scanning period in one field, and means for transmitting, when either part or all of the video signals Vn and Vn−1 differs, either video signal Vx comprising those components of the video signal Vn which differ from video signal Vn−1, or the component of video signal Vn which is coincident with video signal Vn−1;

said transmitter further comprising means for transmitting a code signal indicating the position of the beginning and/or end of the video signal Vx within the field included in the video signal Vx;

said transmitter further comprising means for narrowing the period of the horizontal sync signal in the television signal, wherein a code signal indicating the position of the beginning and/or the end of the video signal Vx or a code signal indicating the changed position is inserted at a thus narrowed component for transmission.

2. A television signal processor according to claim 1, said transmitter further comprising means for transmitting the video signal Vx comprising that part of video signal Vn which differs from the video signal Vn−1 and a video signal V'x comprising those components before and after Vx.

3. A television signal processor comprising:

a transmitter including means for dividing a television signal into horizontal scanning line units, means for comparing a video signal Vn of an nth horizontal scanning period with a video signal Vn−1 of an (n−1)th horizontal scanning period in one field, and means for transmitting, when either part or all of the video signals Vn and Vn−1 differs, either video signal Vx comprising those components of the video signal Vn which differ from video signal Vn−1, or the component of video signal Vn which is coincident with video signal Vn−1;

said transmitter further comprising means for transmitting the video signal Vx comprising that part of video signal Vn which differs from the video signal Vn−1 and a video signal V′x comprising those components before and after the video signal Vx;

a receiver including means for receiving the video signal Vn−1 for the (n−1)th horizontal scanning period in the television signal transmitted from said transmitter, and video signal Vx for the nth horizontal scanning period, and means for mixing, overlaying, replacing or computing video signal Vx with either part or all of video signal Vn−1 to regenerate the video signal Vn at the nth horizontal scanning period, said receiver further comprising:

a first line memory which stores only video signal Vx, which is the difference component of the video signal Vn−1 in the (n−1)th horizontal scanning period in one field and the video signal Vn in the nth horizontal scanning period, or the coincidence component of the video signal Vn−1 and video signal Vn, a second line memory which stores video signal Vx+1, which is the difference component of the video signal Vn in the nth horizontal scanning period and the video signal Vn+1 in the (n+1)th horizontal scanning period, and a third line memory which sequentially stores restored video signal V′x, which is restored from the video signal Vn−1 and video signal Vx, and restored video signal V′x+1, which is restored from restored video signal V′x and video signal Vx+1.

4. A television signal processor according to claim 3, said receiver further comprising means for forming an image signal from the contents of the first line memory and the third line memory when the received television signal is the nth horizontal scanning period, and means for forming an image signal from the contents of the second line memory and the third line memory at the (n+1)th horizontal scanning period.

5. A television signal processor according to claim 3 or claim 4, said receiver further comprising a means which receives and decodes a data signal multiplexed to part or all of the horizontal scanning period in the image display component of the television signal.

6. A television signal processor according to claim 5 wherein when a signal X which is other than the differing video signals Vx, Vx+1 and which is for setting a correspondence between a signal at the transmitter and a signal at the receiver, and a data signal is received, said signal X is ignored.

7. A television signal processor according to claim 5, said receiver further comprising a means for processing either all or part of a signal X which is other than the video signal Vx, Vx+1 and which is for setting a correspondence between a signal at the transmitter and a signal at the receiver, and a data signal.

8. A television signal processor according to claim 3 or claim 4 wherein when a signal X which is other than the differing video signals Vx, Vx+1 and which is for setting a correspondence between a signal at the transmitter and a signal at the receiver, and a data signal is received, said signal X is ignored.

9. A television signal process according to claim 3 or claim 4, said receiver further comprising a means for processing either all or part of a signal X which is other than the video signal Vx, Vx+1 and which is for setting a correspondence between a signal at the transmitter and a signal at the receiver, and data signal.

10. A signal processing method comprising the steps of dividing a television signal into frame or field units, comparing the video signal Vn of the nth frame or field with the video signal Vn+1 of the (n−1)th frame or field, and when either part or all of the video signals Vn and Vn−1 differ, transmitting only video signal Vx comprising those components of the video signal Vn which differ from video signal Vn−1, said method further comprising dividing the video signal Vn of the nth frame or field which is comparison processed with the video signal Vn−1 of the (n−1)th frame or field into horizontal scanning line units, comparing the video signal Vm of the horizontal scanning period m and the video signal Vm−1 of horizontal scanning period m−1, and when either part or all of the video signals Vm and Vm−1 differ, transmitting only video signal Vy comprising those components of the video signal Vm which differ from video signal Vm−1.

11. A signal processor comprising:

a transmitter including means for dividing a television signal into horizontal scanning line units, means for comparing a video signal Vn of an nth horizontal scanning period with a video signal Vn−1 of an (n−1)th horizontal scanning period in one field, and means for transmitting, when either part or all of the video signals Vn and Vn−1 differs, either video signal Vx comprising those components of the video signal Vn which differ from video signal Vn−1, or the component of video signal Vn which is coincident with video signal Vn−1;

said transmitter further comprising means for changing a timing of the transmission of the video signal Vx in the nth horizontal scanning period from the timing at which the video signal Vx exists in the original video signal Vn, and means for transmitting a code signal identifying the thus changed position in the field included in the video signal Vx, said transmitter further comprising means for narrowing the period of the horizontal sync signal in the television signal, wherein a code signal indicating the position of the beginning and/or the end of the video signal Vx or a code signal indicating the changed position is inserted at a thus narrowed component for transmission.

12. A television signal receiver comprising a first storage means for storing a video signal for one frame or one field, and second and third storage means each for storing the video signal for one horizontal scanning period, wherein when the video signal for the nth frame or field is received, the video signal Vk for the kth horizontal scanning period is reproduced from the video signal Vk−1 for the (k−1)th horizontal scanning period stored in the first storage means and the video signal Vy for the kth horizontal scanning period in the nth frame or field received and input to the second and third storage means.

13. A television signal receiver according to claim 12 further comprising a means for re-inverting and restoring to a normal state a video signal transmitted and received in an inverted state.

14. A television signal receiver according to claim 12 wherein multiple video signals Vx existing in one frame or field may be received and processed.

15. A television signal receiver according to claim 14 wherein a signal x which is a data or image signal other than the video signal Vx or Vy is received inserted to an omitted signal area, and is reproduced after reception.

16. A television signal receiver according to claim 14 further comprising a means of re-inverting and restoring to a normal state a video signal transmitted and received in an inverted state.

17. A television signal receiver according to claim 12 wherein a signal x which is a data or image signal other than the video signal Vx or Vy is received inserted to an omitted signal area, and is reproduced after reception.

18. A television signal receiver according to claim 17 further comprising a means of re-inverting and restoring to a normal state a video signal transmitted and received in an inverted state.

19. A television signal receiver according to claim 17 further comprising a means for receiving the signal indicating the phase inserted to the data or image signal x, and separating this signal x.

20. A television signal receiver according to claim 19 further comprising a means of re-inverting and restoring to a normal state a video signal transmitted and received in an inverted state.

21. A television signal receiver according to claim 17 further comprising means for receiving a signal from a transmitter which transmits video signal Vx or Vy at a phase differing from the phase in the source television signal, and means for converting a phase of the thus received signal to an original phase to regenerate the television signal.

22. A television signal receiver according to claim 21 further comprising a means of re-inverting and restoring to a normal state a video signal transmitted and received in an inverted state.

23. A television signal receiver according to claim 21 further comprising a means for receiving a code signal indicating the phase of video signal Vx or Vy in the source television signal, and a means for converting the phase of the received video signal Vx or Vy based on the code signal.

24. A television signal receiver according to claim 23 further comprising a means of re-inverting and restoring to a normal state a video signal transmitted and received in an inverted state.

25. A television signal receiver according to claim 23 which is used after converting the received code signal.

26. A television signal receiver according to claim 25 further comprising a means of re-inverting and restoring to a normal state a video signal transmitted and received in an inverted state.

* * * * *